(12) United States Patent
Ito et al.

(10) Patent No.: US 10,389,193 B2
(45) Date of Patent: Aug. 20, 2019

(54) RELUCTANCE MOTOR AND MANUFACTURING METHOD FOR ROTOR CORE USED IN RELUCTANCE MOTOR

(71) Applicant: MITSUBISHI ELECTRIC CORPORATION, Chiyoda-ku (JP)

(72) Inventors: Kazumasa Ito, Chiyoda-ku (JP);
Shinichi Yamaguchi, Chiyoda-ku (JP);
Haruyuki Kometani, Chiyoda-ku (JP);
Masatsugu Nakano, Chiyoda-ku (JP);
Norihiro Achiwa, Chiyoda-ku (JP);
Yoshiki Maeda, Chiyoda-ku (JP);
Masaya Harakawa, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 87 days.

(21) Appl. No.: 15/548,444

(22) PCT Filed: Jan. 28, 2016

(86) PCT No.: PCT/JP2016/052473
§ 371 (c)(1),
(2) Date: Aug. 3, 2017

(87) PCT Pub. No.: WO2016/139991
PCT Pub. Date: Sep. 9, 2016

(65) Prior Publication Data
US 2018/0019628 A1 Jan. 18, 2018

(30) Foreign Application Priority Data
Mar. 3, 2015 (JP) .................................. 2015-041122

(51) Int. Cl.
*H02K 1/22* (2006.01)
*H02K 1/24* (2006.01)
(Continued)

(52) U.S. Cl.
CPC ............... *H02K 1/246* (2013.01); *H02K 1/22* (2013.01); *H02K 1/24* (2013.01); *H02K 1/276* (2013.01);
(Continued)

(58) Field of Classification Search
CPC ............ H02K 1/22; H02K 1/24; H02K 1/246; H02K 1/276; H02K 2213/03; H02K 29/03
See application file for complete search history.

(56) References Cited

U.S. PATENT DOCUMENTS

2012/0062053 A1   3/2012   Moghaddam
2014/0346911 A1   11/2014  Tsuchida et al.
(Continued)

FOREIGN PATENT DOCUMENTS

JP   2001-136717 A   5/2001
JP   2009-77458 A    4/2009
(Continued)

OTHER PUBLICATIONS

International Search Report dated Apr. 26, 2016 in PCT/JP2016/052473 filed Jan. 28, 2016.

*Primary Examiner* — Dang D Le
(74) *Attorney, Agent, or Firm* — Oblon, McClelland, Maier & Neustadt, L.L.P.

(57) ABSTRACT

With regard to an end portion shape of a slit formed in a rotor core in which flux barriers are formed in a circumferential direction in an identical number to the number of poles by arranging one or more slits and core layers alternately in a radial direction, an end portion of a slit is shaped such that, when $m_g$ is set as the number of slit end portions, $n_i$ is set as a natural number no smaller than 1, $\alpha$ and $\beta$ are set as numbers within a range of $-\frac{1}{4}$ to $\frac{1}{4}$, q is set as a natural number no smaller than 1, and $N_s$ is set as the number of slots, intervals $\delta^g{}_i$ and $\epsilon^g{}_i$ from a first slit end to an $i^{th}$ slit end of a slit wall on an identical circumferential direction side satisfy specific mathematical formulae.

9 Claims, 16 Drawing Sheets

(51) Int. Cl.
*H02K 29/03* (2006.01)
*H02K 1/27* (2006.01)
(52) U.S. Cl.
CPC ......... *H02K 29/03* (2013.01); *H02K 2213/03* (2013.01)

(56) References Cited

U.S. PATENT DOCUMENTS

2016/0329787 A1* 11/2016 Ito .................... H02K 1/246
2017/0366075 A1* 12/2017 Tong ................. H02K 1/145

FOREIGN PATENT DOCUMENTS

| | | |
|---|---|---|
| JP | 2012-520055 A | 8/2012 |
| JP | 2014-82928 A | 5/2014 |
| WO | 2013/098912 A1 | 7/2013 |

* cited by examiner

CASE (a)

CASE (b)

CASE (c)

ANGLE (ELECTRICAL ANGLE) OF SLIT END PORTION [°]

RELUCTANCE MOTOR AND MANUFACTURING METHOD FOR ROTOR CORE USED IN RELUCTANCE MOTOR

TECHNICAL FIELD

This invention relates to a reluctance motor that generates reluctance torque, and more particularly to a reluctance motor configuration for reducing a torque ripple, as well as a method of manufacturing a rotor core used in the reluctance motor.

BACKGROUND ART

A reluctance motor is a motor that generates torque using a configuration in which slit-shaped flux barriers are formed in a rotor core such that a magnetic resistance difference is generated in a rotation direction of a rotor. This type of reluctance motor is advantaged over an inductance motor (induction machine) in that secondary copper loss does not occur in the rotor and so on. In the light of these advantages, reluctance motors are gaining attention as motors used in applications such as air-conditioners and automobiles.

However, a reluctance motor typically generates a large torque ripple, and therefore further improvements are required to enable a reluctance motor to be used in the above applications.

As noted above, the principle by which a reluctance motor generates output torque is the magnetic resistance difference generated in the rotation direction of the rotor. This output torque is known as reluctance torque T, and is expressed by a following equation.

$$T = Pn(Ld-Lq)id \times iq$$

Here, Pn denotes the number of pole pairs, Ld denotes d axis inductance, Lq denotes q axis inductance, id denotes a d axis current, and iq denotes a q axis current. It is evident from the above equation that in order to achieve an improvement in efficiency by increasing the torque generated in accordance with the current of the reluctance motor, it is effective to increase Ld−Lq, i.e. the difference between the d axis inductance and the q axis inductance.

It is also known that in order to increase a power factor, Ld/Lq, i.e. the ratio of the d axis inductance to the q axis inductance, should be increased. The value of the ratio Ld/Lq is typically referred to as a salient pole ratio.

To increase the difference Ld−Lq and the salient pole ratio Ld/Lq, a plurality of layers of slits known as flux barriers are provided in a rotor core of the reluctance motor. In so doing, d axis magnetic paths facilitating the flow of magnetic flux are formed in directions corresponding to the plurality of layers of slits, and magnetic resistance on q axis magnetic paths crossing the plurality of layers of slits is increased.

The following configuration is an example of prior art employed to reduce the torque ripple using the flux barrier structure described above as a basic structure (see PTL 1, for example).

As a rotor laminated core for a reluctance motor disclosed in PTL 1, a plurality of arc-shaped slits projecting on a rotary shaft hole side are formed concentrically, and core pieces formed by arranging the plurality of arc-shaped slits at intervals around the rotary shaft hole are laminated.

In the rotor laminated core for a reluctance motor, which is rotated by reluctance torque generated on the basis of a difference in inductance between a salient pole direction, in which magnetic flux flows easily in an extension direction of the arc-shaped slits, and a non-salient pole direction, in which magnetic flux does not flow easily in a parallel direction to the extension direction of the arc-shaped slits, end portions of the plurality of arc-shaped slits are formed at equal intervals around the entire circumference of the core piece. By employing this configuration, PTL 1 achieves a reduction in the torque variation, or in other words the torque ripple, of the rotor.

CITATION LIST

Patent Literature

[PTL 1] Japanese Patent Application Publication No. 2009-77458

SUMMARY OF INVENTION

Technical Problem

However, the prior art contains the following problem.

In the reluctance motor described in PTL 1, the plurality of slits must be formed by punching the core piece. Therefore, the magnetic characteristic deteriorates in corresponding locations during the punching operation. To suppress this deterioration, there is a disadvantage in that either thermal treatment such as annealing must be implemented, or the motor itself must be increased in size in order to compensate for the characteristic deterioration.

This point is also mentioned in PTL 1, but although the number of slits per pole is reduced to five, this is not a radical reduction in number, and therefore deterioration of the magnetic characteristic of the core remains a problem.

This invention has been designed to solve the problem described above, and an object thereof is to obtain a reluctance motor capable of reducing a torque ripple even with a reduced number of slits, and a manufacturing method for a rotor core used in the reluctance motor.

Solution to Problem

A reluctance motor according to this invention includes a rotor configured by fixing a rotor core to a shaft, and a stator having slots in which windings are housed, the rotor and the stator being disposed to be free to rotate via a magnetic gap, wherein the number of the slots is set as Ns, the rotor core includes flux barriers formed in a circumferential direction in an identical number to the number of poles by arranging one or more slits and core layers alternately in a radial direction, slit end portions close to a rotor outer periphery, of the slits provided for each pole, are divided into at least one group, the number of slit end portions included in one group having a group number g is set as $m_g$, numbers from first to $m_g$-th are allocated to the slit end portions sequentially from a right side of the circumferential direction, and the flux barriers are respectively configured such that, with respect to slit walls extending from the rotor outer periphery toward an inner periphery in each slit end portion, when an interval from a first slit end to an $i^{th}$ slit end of a right side slit wall, as seen in the circumferential direction, is set as $\delta^g_i$, $n_1$ is set as a natural number no smaller than 1, $\alpha$ is set as a number within a range no smaller than $-\frac{1}{4}$ and no larger than $\frac{1}{4}$, and q is set as a natural number no smaller than 1, $\delta^g_i$ satisfies Equation (1) of the claims, and when an interval from a first slit end to an $i^{th}$ slit end of a left side slit wall, as seen in the circumferential direction, is set as $\varepsilon^g_i$, is set as a natural number no smaller than 1, $\beta$ is set as a number within a range no smaller than −¼ and no larger than ¼, and q is set as a natural number no smaller than 1, $\varepsilon^g_i$ satisfies Equation (2) of the claims.

Further, a manufacturing method for a rotor core used in a reluctance motor according to this invention is applied to a reluctance motor having a rotor configured by fixing a rotor core to a shaft, and a stator having slots in which windings are housed, the rotor and the stator being disposed to be free to rotate via a magnetic gap, wherein, in a case where the number of the slots is set as Ns, the rotor core includes flux barriers formed in a circumferential direction in an identical number to the number of poles by arranging one or more slits and core layers alternately in a radial direction, slit end portions close to a rotor outer periphery, of the slits provided for each pole, are divided into at least one group, the number of slit end portions included in one group having a group number g is set as $m_g$, and numbers from first to $m_g$-th are allocated to the slit end portions sequentially from a right side of the circumferential direction, the manufacturing method includes a step of forming the slits by implementing punching processing on a thin steel plate such that, with respect to slit walls extending from the rotor outer periphery toward an inner periphery in each slit end portion, when an interval from a first slit end to an $i^{th}$ slit end of a right side slit wall, as seen in the circumferential direction, is set as $\delta^g_i$, $n_1$ is set as a natural number no smaller than 1, $\alpha$ is set as a number within a range no smaller than −¼ and no larger than ¼, and q is set as a natural number no smaller than 1, $\delta^g_i$ satisfies Equation (5) of the claims, and when an interval from a first slit end to an $i^{th}$ slit end of a left side slit wall, as seen in the circumferential direction, is set as $\varepsilon^g_i$, $l_1$ is set as a natural number no smaller than 1, $\beta$ is set as a number within a range no smaller than −¼ and no larger than ¼, and q is set as a natural number no smaller than 1, $\varepsilon^g_i$ satisfies Equation (6) of the claims.

Advantageous Effects of Invention

According to this invention, the shape of the slit is defined such that a qNs/p order torque ripple component generated due to the effect of the slit end portion can be reduced even in a case where one or two slits are formed in a single flux barrier. As a result, it is possible to obtain a reluctance motor capable of reducing a torque ripple even with a reduced number of slits, and a manufacturing method for a rotor core used in the reluctance motor.

DESCRIPTION OF EMBODIMENTS

Preferred embodiments of a reluctance motor and a manufacturing method for a rotor core used in the reluctance motor according to this invention will be described below using the drawings.

First Embodiment

Figure 1:
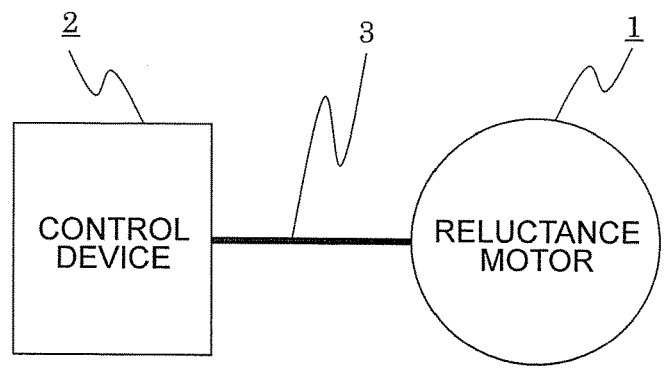
FIG. 1 is a view showing a system during use of a reluctance motor according to a first embodiment of this invention.

FIG. 1 is a view showing a system during use of a reluctance motor according to a first embodiment of this invention. In FIG. 1, a reluctance motor 1 is connected to a control device 2 via a power supply line 3. The reluctance motor 1 is an electrical machine for converting electrical energy supplied from the control device 2 into mechanical energy.

Figure 2:
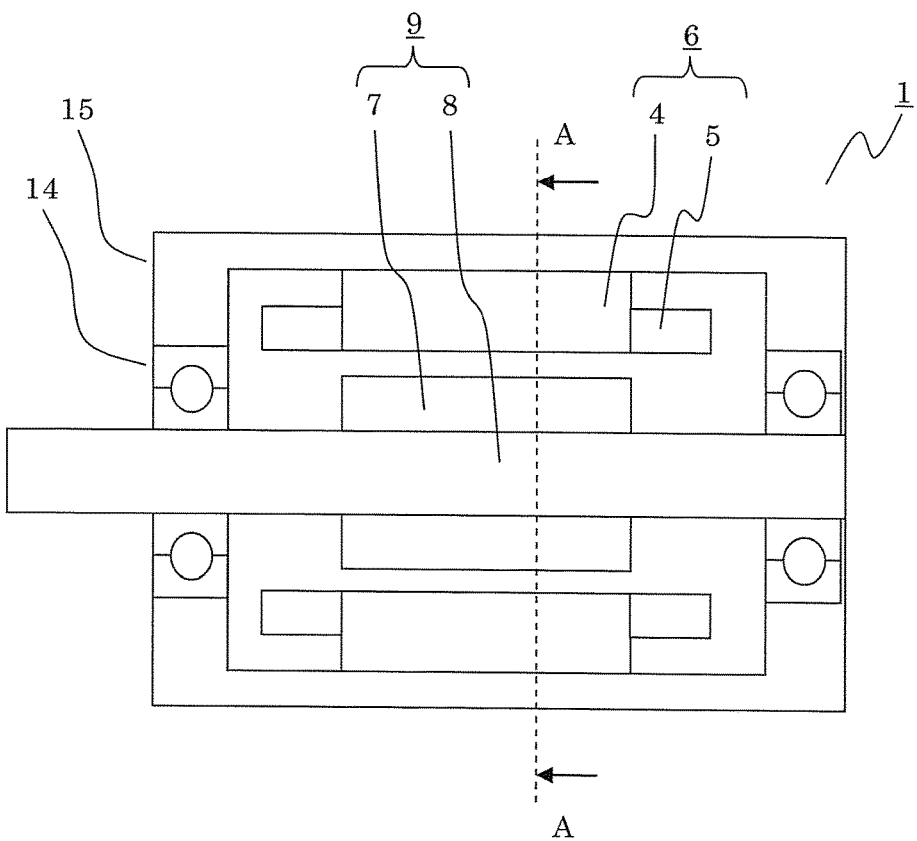
FIG. 2 is a sectional view obtained by cutting the reluctance motor according to the first embodiment of this invention in an axial direction.

FIG. 2 is a sectional view obtained by cutting the reluctance motor 1 according to the first embodiment of this invention in an axial direction. In FIG. 2, a stator 6 and a rotor 9 inserted fixedly into a frame 15 using a method such as press-fitting or shrink-fitting are arranged to be free to rotate relative to each other via a mechanical gap using a bearing 14.

The stator 6 is formed by applying windings 5 to a stator core 4 constituted by a magnetic core. The stator 6 functions to generate a rotating magnetic field in a magnetic gap when electrical energy is applied to the windings 5 from the control device 2.

The rotor 9 is formed integrally by inserting a shaft 8 into the center of a rotor core 7 constituted by a magnetic core using a method such as press-fitting or shrink-fitting. Here, the rotor core 7 is formed by laminating thin steel plates in an axial direction.

Figure 3:
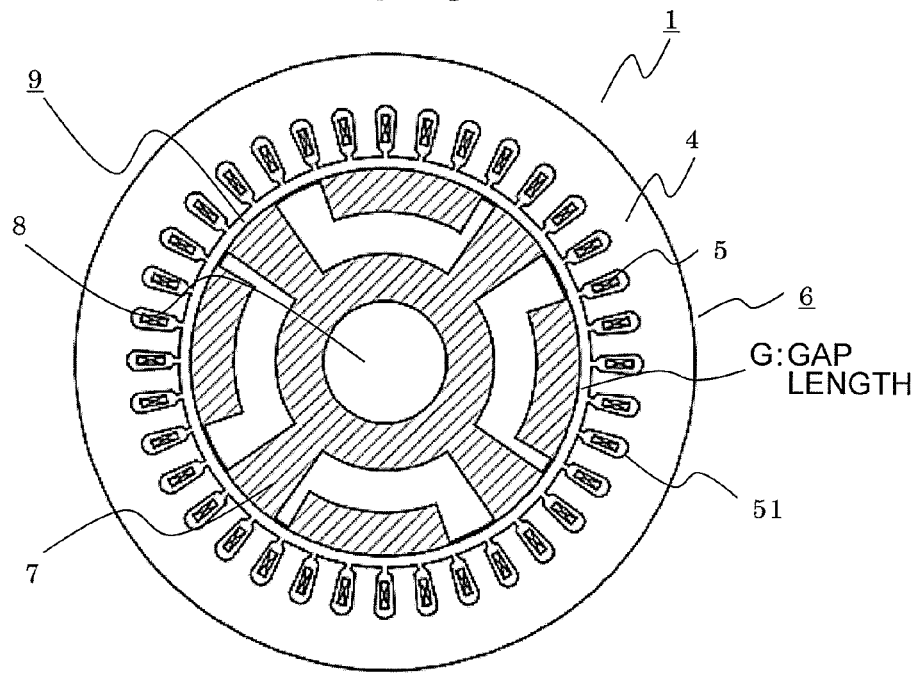
FIG. 3 is a sectional view obtained by cutting the reluctance motor according to the first embodiment of this invention along an A-A line in FIG. 2.

FIG. 3 is a sectional view obtained by cutting the reluctance motor 1 according to the first embodiment of this invention along an A-A line in FIG. 2. In FIG. 3, the stator 6 and the rotor 9 are arranged substantially concentrically such that a radial direction distance G of the mechanical gap therebetween is maintained as a gap length. Slots 51 housing the windings 5 are formed in the stator 6, and in FIG. 3, 36 slots 51 are provided.

Figure 4:
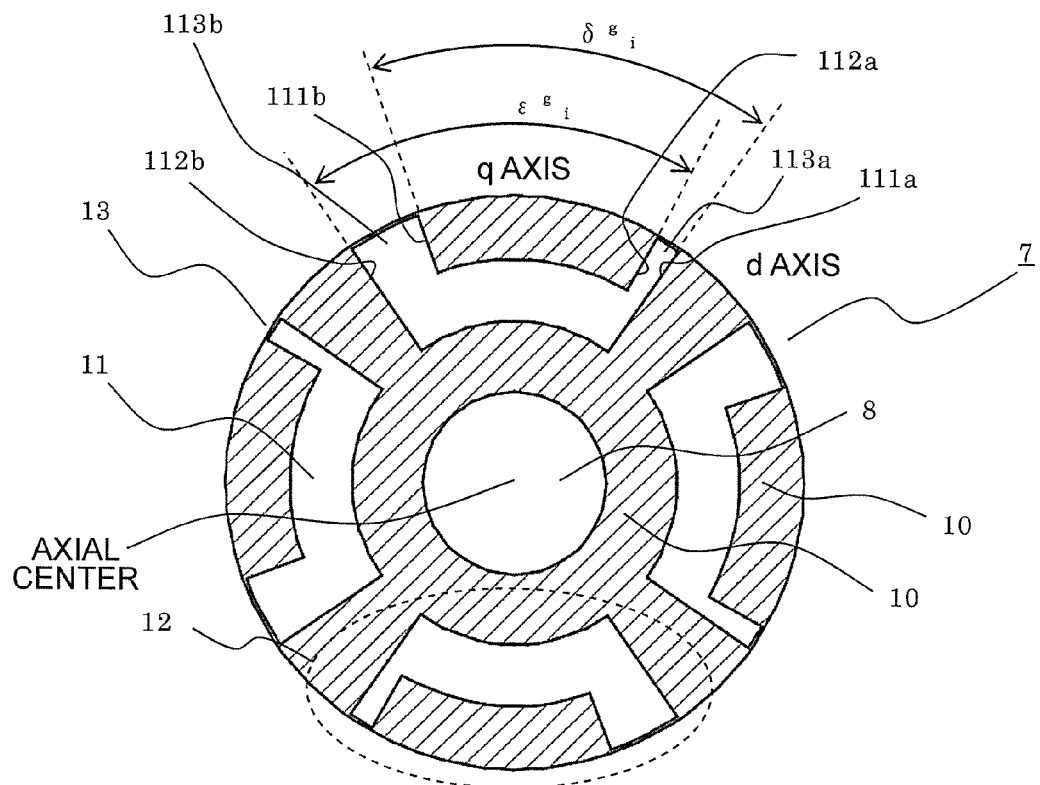
FIG. 4 is a sectional view showing a rotor core of the reluctance motor according to the first embodiment of this invention.

FIG. 4 is a sectional view showing the rotor core 7 of the reluctance motor 1 according to the first embodiment of this invention. More specifically, FIG. 4 shows only the rotor part extracted from FIG. 3. In FIG. 4, four identically shaped flux barriers 12 are formed in the rotor core 7 at substantially equal intervals in a circumferential direction. Accordingly, the reluctance motor 1 according to the first embodiment can be driven as a four-pole motor.

In the flux barriers 12, slits 11 formed from a different material to the magnetic core provided in the rotor core 7 are arranged in a row in a radial direction, and the remaining magnetic core parts serve as core layers 10. Note that FIG. 4 shows an example in which the slits 11 are arranged in a single row in the radial direction.

Each slit 11 is formed to have a maximum radial direction width on at least a q axis. The width of the slit 11 preferably remains the same from one end to another end of a lengthwise direction, but it may be impossible to maintain an identical width on an outermost peripheral side. Further, ends of the slit may be chamfered into an arc shape. However, these differences are within an allowable range.

In FIG. 4, a d axis and a q axis are defined on a cross-section of the rotor core 7 respectively as a direction in which magnetic flux flows easily and a direction in which magnetic flux does not flow easily. The d axis and the q axis have an electrical phase difference of 90 degrees.

Next, a bridge 13 forming a slit end portion 113, and slit walls 111, 112 will be described. In the first embodiment, two slit end portions 113 exist for each pole. In the following description, for convenience, the slit end portion 113 on the right side of the circumferential direction, as seen from the axial center, will be referred to as a first slit end portion 113a, and the slit end portion 113 on the left side will be referred to as a second slit end portion 113b.

Using the axial center as a reference, an angle $\delta^g_i$ from a slit wall 111a extending from a rotor outer periphery toward an inner periphery on a circumferential direction right-hand side of the axial center of the first slit end portion 113a to a slit wall 111b extending from the rotor outer periphery toward the inner periphery on a circumferential direction right-hand side of the axial center of the second slit end portion 113b is expressed by Equation (1) shown below.

$$\delta^g_i = \frac{2\pi}{qN_s}\left(\frac{i-1}{m_g} + n_i + \alpha\right) \text{ [rad]} \quad (1)$$

In Equation (1), the respective reference symbols denote the following content.

$m_g$ denotes the number of slit end portions, and in FIG. 4, $m_g=2$.

An interval from a first slit end to an $i^{th}$ slit end of slit walls on the same circumferential direction side is set as $\delta^g_i$, and here, i=2.

$n_i$ denotes a natural number no smaller than 1, and in FIG. 4, $n_i=5$.

α denotes a number within a range of −¼ to ¼, and in FIG. 4, α=0.

q denotes a natural number no smaller than 1, and in FIG. 4, q=1.

$N_s$ denotes 36, as described above.

From these settings, a value on the left side of Equation (1) is set as shown below.

$$\delta^g_i = 55°$$

Meanwhile, using the axial center as a reference, an angle $\varepsilon^g_i$ from a slit wall 112a extending from the rotor outer periphery toward the inner periphery on the circumferential direction left-hand side of the axial center of the first slit end portion 113a to a slit wall 112b extending from the rotor outer periphery toward the inner periphery on the circumferential direction left-hand side of the axial center of the second slit end portion 113b is expressed by Equation (2) shown below.

$$\varepsilon^g_i = \frac{2\pi}{qN_s}\left(\frac{i-1}{m_g} + l_i + \beta\right) \text{ [rad]} \quad (2)$$

In Equation (2), the respective reference symbols denote the following content.

$m_g$ denotes the number of slit end portions, and in FIG. 4, $m_g=2$.

The interval from the first slit end to the $i^{th}$ slit end of the slit walls on the same circumferential direction side is set as $\varepsilon^g_i$, and here, i=2.

$l_i$ denotes a natural number no smaller than 1, and in FIG. 4, $l_i=6$.

β denotes a number within a range of −¼ to ¼, and in FIG. 4, β=0.

q denotes a natural number no smaller than 1, and in FIG. 4, q=1.

$N_s$ denotes 36, as described above.

From these settings, a value on the left side of Equation (2) is set as shown below.

$$\varepsilon^g_i = 65°$$

As shown in FIG. 1, the reluctance motor 1 according to the first embodiment is configured such that electrical energy is supplied from the control device 2, and the control device 2 controls a current flowing through the windings 5 of the stator 6.

Figure 5:
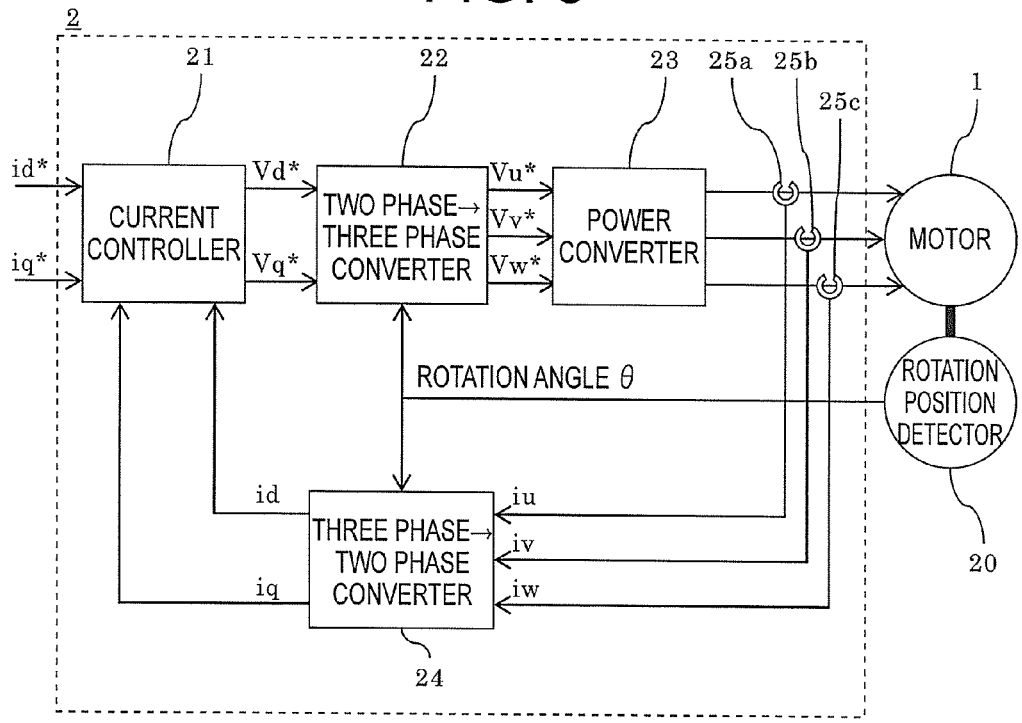
FIG. 5 is a block diagram showing current control executed by a control device 2 according to the first embodiment of this invention.

FIG. 5 is a block diagram showing current control executed by the control device 2 according to the first embodiment of this invention. FIG. 5 is block diagram showing so-called vector control. In FIG. 5, a rotation position detector 20 is connected to the reluctance motor 1 in order to detect a rotation position θ of the rotor, and transmits the detected rotation position θ to the control device 2.

Figure 6:
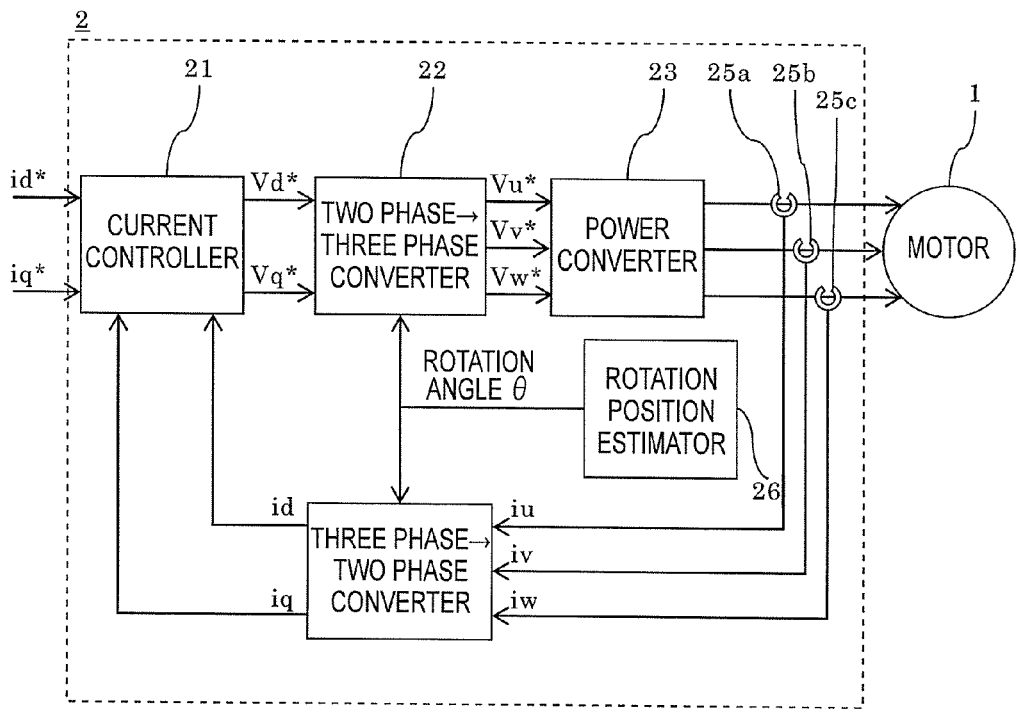
FIG. 6 is a block diagram showing different current control to that of FIG. 5, executed by the control device 2 according to the first embodiment of this invention.

FIG. 6 is a block diagram showing different current control to that of FIG. 5, executed by the control device 2 according to the first embodiment of this invention. As a configuration for detecting the rotation position θ, a rotation position estimator 26 disposed in the control device 2, as shown in FIG. 6, may be used in place of the rotation position detector 20 shown in FIG. 5.

However, when the rotation position detector 20 shown in FIG. 5 is used, an advantage is obtained in that the precision of the detected rotation position θ can be improved. When the rotation position estimator 26 shown in FIG. 6 is used, on the other hand, although the precision is inferior to that of the rotation position detector 20, a cost advantage is obtained due to the fact that the number of components is reduced. Hence, by selecting one of the configurations shown in FIGS. 5 and 6 in accordance with the application, the reluctance motor 1 can be provided in a preferable form.

To control the reluctance motor 1, the control device 2 controls the current flowing through the windings 5 of the stator 6 on the basis of current commands id* and iq* applied either internally or externally. Respective values of currents iu, iv, iw of three phases, obtained from a current detector 25, are input into a three phase→two phase converter 24 together with the rotation position θ.

Currents id and iq of two phases calculated as the output of the three phase→two phase converter 24 are input into a current controller 21 as feedback information. The current controller 21 then calculates and generates voltage commands Vd* and Vq* on the basis of respective deviations between the current commands id* and iq* and the fed-back currents id and iq of two phases using a method such as PID control.

The generated voltage commands Vd* and Vq* are input into a two phase→three phase converter 22 together with the rotation position θ. The two phase→three phase converter 22 calculates and outputs voltage commands Vu*, Vv*, Vw* for three phases. A power converter 23 outputs power to be supplied to the synchronous reluctance motor 1 using the voltage commands Vu*, Vv*, Vw* for three phases as input.

Thus, the fed-back currents id and iq are subjected to feedback control so as to reduce the difference between the currents id and iq and the current commands id* and iq*, or in other words so that the currents id and iq approach the current commands id* and iq*.

Figure 7:
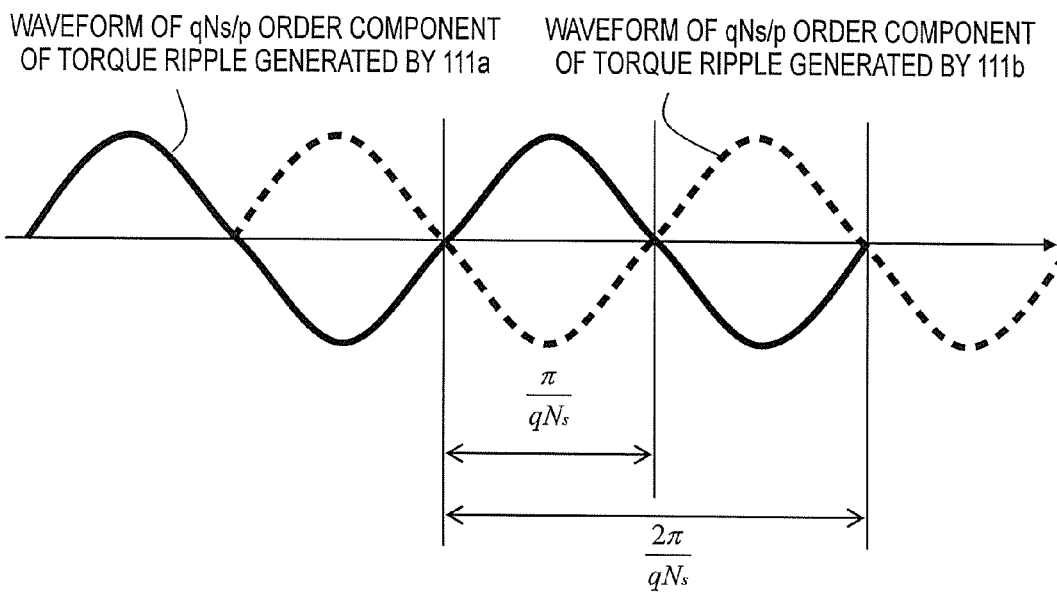
FIG. 7 is an illustrative view showing how a qNs/p order component of a torque ripple can be reduced in the reluctance motor according to the first embodiment of this invention.

FIG. 7 is an illustrative view showing how a qNs/p order component of a torque ripple can be reduced in the reluctance motor 1 according to the first embodiment of this invention. By providing the flux barriers 12 in the manner shown in FIG. 4, respective phases of the qNs/p order component of a torque ripple generated by the slit wall 111a and the qNs/p order component of a torque ripple generated by the slit wall 111b are shifted by approximately 2π/(qNs)× ½, as shown in FIG. 7.

Thus, a torque ripple waveform generated by the slit wall 111b can be reversed relative to a torque ripple waveform generated by the slit wall 111a, and as a result, the qNs/p order component of the torque ripple can be reduced.

Respective torque ripple waveforms of the qNs/p order component of a torque ripple generated by the slit wall 112a and the qNs/p order component of a torque ripple generated by the slit wall 112b can be reversed in a similar manner, and as a result, the qNs/p order component of the torque ripple can be reduced.

Figure 8:
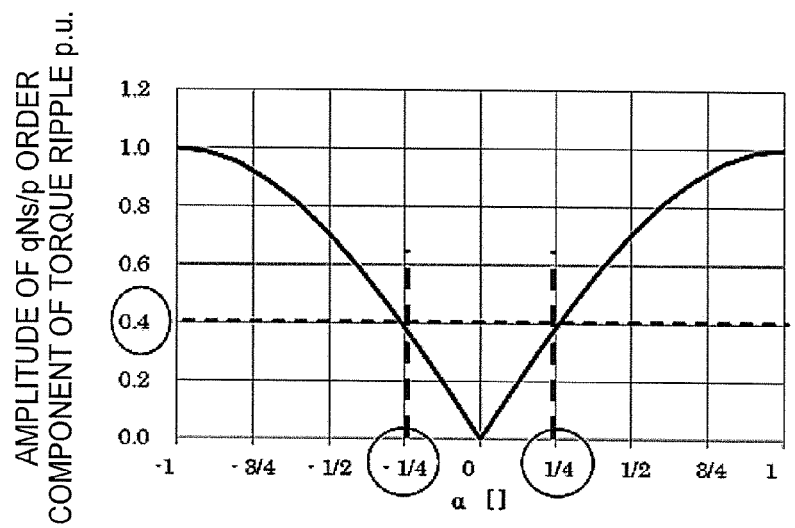
FIG. 8 is a view showing how the qNs/p order component of the torque ripple of the reluctance motor according to the first embodiment of this invention is dependent on a coefficient $\alpha$.

FIG. 8 is a view showing how the qNs/p order component of the torque ripple of the reluctance motor 1 according to the first embodiment of this invention is dependent on a coefficient α. More specifically, FIG. 8 shows the dependence on α of an amplitude of the qNs/p order component of the torque ripple. When α is zero, the amplitude of the qNs/p order component of the torque ripple can be minimized, which is most preferable. Further, when α is within a range of −¼ to ¼, a reduction of at least 60% can be achieved in comparison with a case where α=−1 or α=1, and therefore this range is satisfactory in practical terms.

Furthermore, the phase of the torque ripple waveform may be shifted by applying processing such as chamfering to the slit end portions 113. In so doing, it may be possible to correct α and β to within the range of −¼ to ¼.

Figure 9:
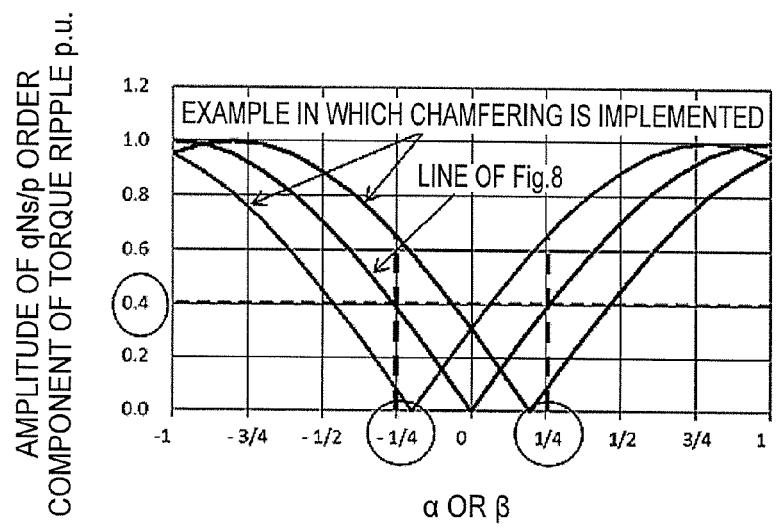
FIG. 9 is a view showing an example of an amplitude of the qNs/p order component of the torque ripple in a case where chamfering is implemented according to the first embodiment of this invention.

FIG. 9 is a view showing an example of the amplitude of the qNs/p order component of the torque ripple in a case where chamfering is implemented according to the first embodiment of this invention. Chamfering is typically implemented at a radius no greater than 0.5 mm, and as a result, the circumferential direction position of the slit wall, as seen from the outer periphery of the rotor, appears indistinct in magnetic terms. Therefore, when the phase of the torque ripple waveform is shifted, α may take a minimum value other than zero. In this case, as described above, α and β are corrected to within a range no smaller than −¼ and no larger than ¼.

Heretofore, to keep the description extremely simple, a case in which a single slit 11 is provided in the flux barrier 12 has been described. However, the torque ripple can be reduced likewise when the number of slit 11 provided in the flux barrier 12 is set at two or more, by forming a similar arrangement to that of a case in which a single slit 11 is provided.

Figure 10:
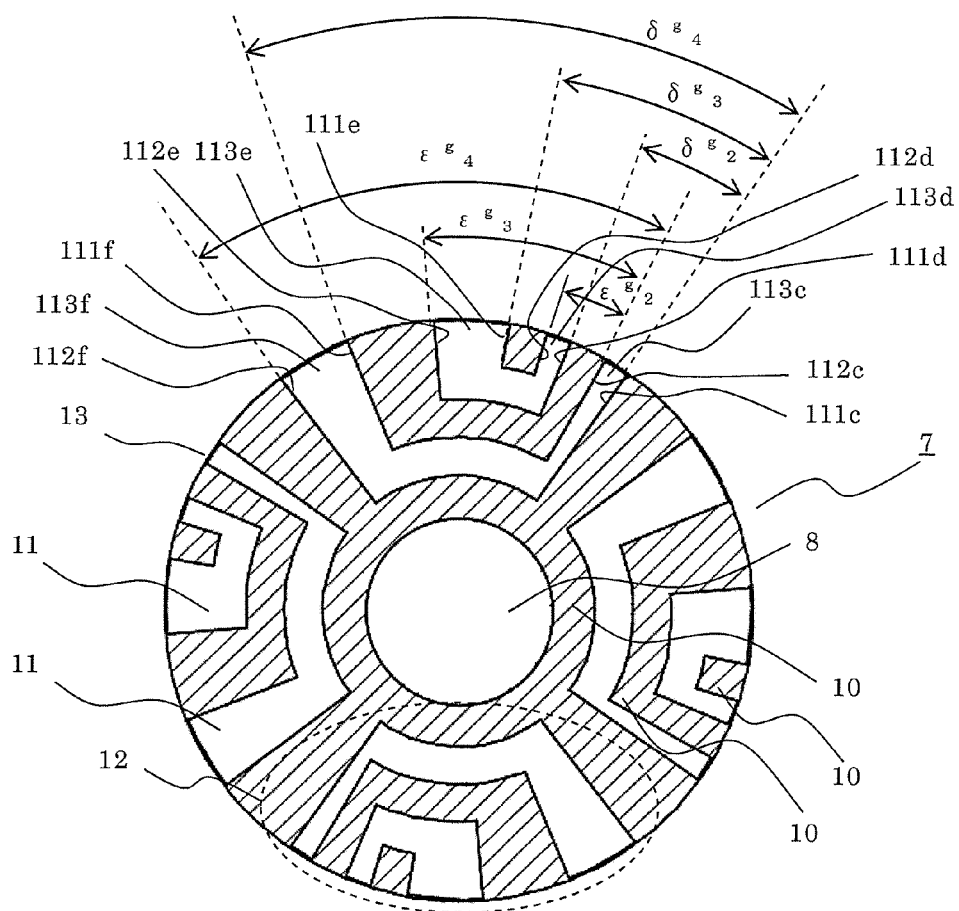
FIG. 10 is a different sectional view to FIG. 4, showing the rotor core of the reluctance motor according to the first embodiment of this invention.

FIG. 10 is a different sectional view to FIG. 4, showing the rotor core 7 of the reluctance motor 1 according to the first embodiment of this invention. FIG. 10 shows an example in which two slits 11 are provided in the flux barrier 12. In FIG. 10, four slit end portions 113 exist in each flux barrier 12.

For convenience, of these four slit end portions 113c, 113d, 113e, 113f, the slit end portion furthest toward the circumferential direction right-hand side, as seen from the axial center, will be referred to as a first slit end portion 113c, the slit end portion on the left side thereof will be referred to as a second slit end portion 113d, the slit end portion on the left side thereof will be referred to as a third slit end portion 113e, and the slit end portion furthest toward the left-hand side will be referred to as a fourth slit end portion 113f.

Using the axial center as a reference, an angle $\delta^g_2$ from a slit wall 111c extending from the rotor outer periphery toward the inner periphery on the circumferential direction right-hand side of the axial center of the first slit end portion 113c to a slit wall 111d extending from the rotor outer periphery toward the inner periphery on the circumferential direction right-hand side of the axial center of the second slit end portion 113d is expressed by Equation (3) shown below.

$$\delta_2^g = \frac{2\pi}{qN_s}\left(\frac{i-1}{m_g} + n_i + \alpha\right) \text{ [rad]} \quad (3)$$

In Equation (3), the respective reference symbols denote the following content.

$m_g$ denotes the number of slit end portions, and in FIG. 10, $m_g$=4.

The interval from the first slit end to the $i^{th}$ slit end of the slit walls on the same circumferential direction side is set as $\delta_i^g$, and here, i=2.

$n_i$ denotes a natural number no smaller than 1.

$\alpha$ denotes a number within a range of −¼ to ¼.

q denotes a natural number no smaller than 1.

Similarly, using the axial center as a reference, an angle $\delta_3^g$ from the slit wall 111c extending from the rotor outer periphery toward the inner periphery on the circumferential direction right-hand side of the axial center of the first slit end portion 113c to a slit wall 111e extending from the rotor outer periphery toward the inner periphery on the circumferential direction right-hand side of the axial center of the third slit end portion 113e is expressed by Equation (4) shown below.

$$\delta_3^g = \frac{2\pi}{qN_s}\left(\frac{i-1}{m_g} + n_i + \alpha\right) \text{ [rad]} \quad (4)$$

In Equation (4), the respective reference symbols denote the following content.

$m_g$ denotes the number of slit end portions, and in FIG. 10, $m_g$=4.

The interval from the first slit end to the $i^{th}$ slit end of the slit walls on the same circumferential direction side is set as $\delta_i^g$, and here, i=3.

$n_i$ denotes a natural number no smaller than 1.

$\alpha$ denotes a number within a range of −¼ to ¼.

q denotes a natural number no smaller than 1.

Furthermore, similarly, using the axial center as a reference, an angle $\delta_4^g$ from the slit wall 111c extending from the rotor outer periphery toward the inner periphery on the circumferential direction right-hand side of the axial center of the first slit end portion 113c to a slit wall 111f extending from the rotor outer periphery toward the inner periphery on the circumferential direction right-hand side of the axial center of the fourth slit end portion 113f is expressed by Equation (5) shown below.

$$\delta_4^g = \frac{2\pi}{qN_s}\left(\frac{i-1}{m_g} + n_i + \alpha\right) \text{ [rad]} \quad (5)$$

In Equation (5), the respective reference symbols denote the following content.

$m_g$ denotes the number of slit end portions, and in FIG. 10, $m_g$=4.

The interval from the first slit end to the $i^{th}$ slit end of the slit walls on the same circumferential direction side is set as $\delta_i^g$, and here, i=4.

$n_i$ denotes a natural number no smaller than 1.

$\alpha$ denotes a number within a range of −¼ to ¼.

q denotes a natural number no smaller than 1.

Similarly to the above, intervals $\varepsilon_2^g$, $\varepsilon_3^g$, and $\varepsilon_4^g$ from the slit wall 112c extending from the outer periphery of the rotor toward the inner periphery on the circumferential direction left-hand side of the axial center to 111d, 111e, and 111f, respectively, are expressed in a similar form to Equation (2).

To summarize this content, the angles $\delta_2^g$, $\delta_3^g$, $\delta_4^g$ and $\varepsilon_2^g$, $\varepsilon_3^g$, $\varepsilon_4^g$ in FIG. 10 are as shown on Table 1.

TABLE 1

| Angles in FIG. 9 | | | | | |
|---|---|---|---|---|---|
| | q | $N_s$ | $m_g$ | $n_i$ or $l_i$ | $\alpha$ or $\beta$ | $\delta_i^g$ or $\varepsilon_i^g$ |
| $\delta_2^g$ | 1 | 36 | 4 | 1 | 0 | 12.5° |
| $\delta_3^g$ | 1 | 36 | 4 | 3 | 0 | 35.0° |
| $\delta_4^g$ | 1 | 36 | 4 | 6 | 0 | 67.5° |
| $\varepsilon_2^g$ | 1 | 36 | 4 | 1 | 0 | 12.5° |
| $\varepsilon_3^g$ | 1 | 36 | 4 | 2 | 0 | 25.0° |
| $\varepsilon_4^g$ | 1 | 36 | 4 | 5 | 0 | 57.5° |

With this configuration, the phases of the qNs/p order components of the torque ripples generated by the slit walls 111c to 111f are respectively shifted by $2\pi/(qNs)\times¼$. Accordingly, the sum thereof approaches zero, and as a result, the qNs/p order component of the torque ripple can be reduced.

The slit walls 112c to 112f act in a similar manner, enabling a reduction in the qNs/p order component of the torque ripple.

Figure 11:
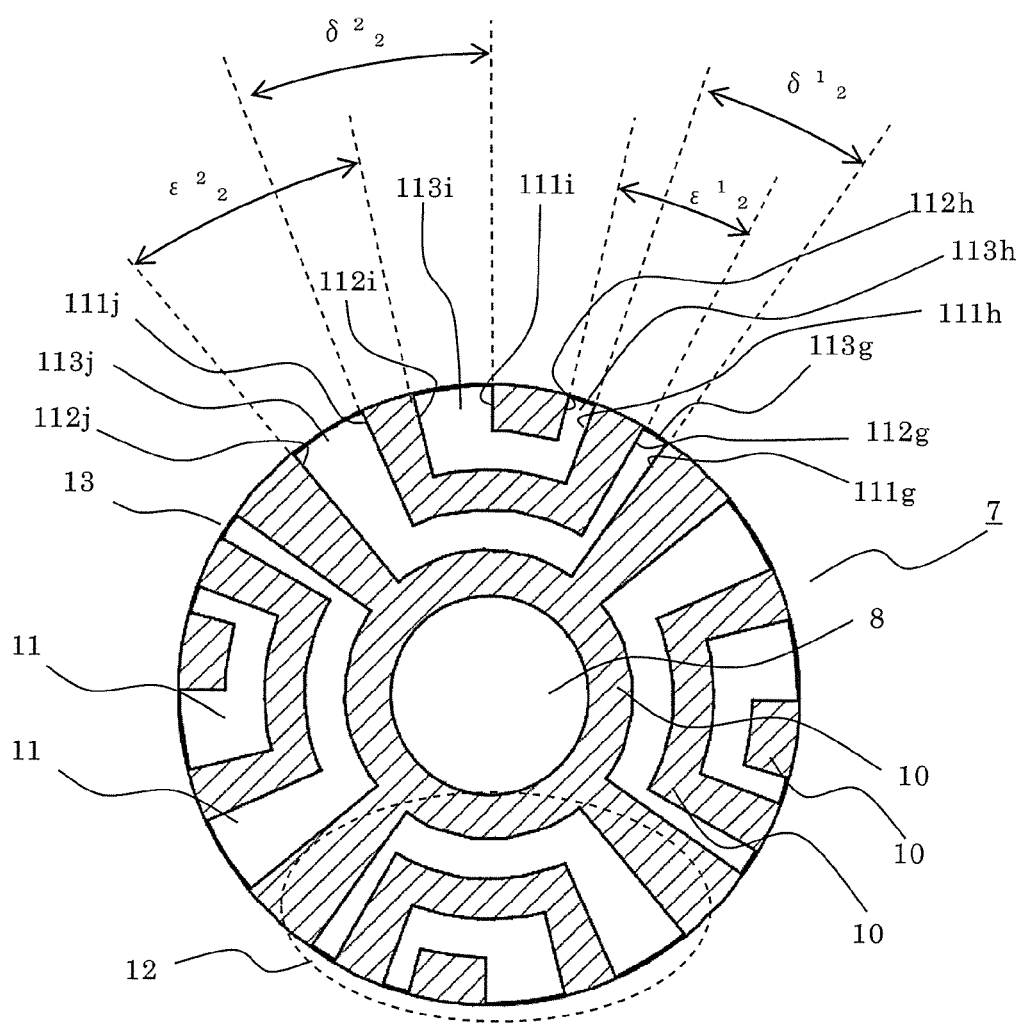
FIG. 11 is a different sectional view to FIG. 10, showing the rotor core of the reluctance motor according to the first embodiment of this invention.

FIG. 11 is a different sectional view to FIG. 10, showing the rotor core 7 of the reluctance motor 1 according to the first embodiment of this invention. FIG. 11 shows another example in which two slits 11 are provided in the flux barrier 12. In FIG. 11, four slit end portions 113 exist.

In the embodiment shown in FIG. 11, four slit end portions 113g, 113h, 113i, 113j are divided into two groups. For convenience, the slit end portion furthest toward the circumferential direction right-hand side, as seen from the axial center, will be referred to as a first group first slit end portion 113g, the slit end portion on the left side thereof will be referred to as a first group second slit end portion 113h, the slit end portion on the left side thereof will be referred to as a second group first slit end portion 113i, and the slit end portion furthest toward the left-hand side will be referred to as a second group second slit end portion 113j.

In the first group, a relative angle $\delta_2^1$ between slit walls 111g and 111h is expressed by Equation (6) shown below.

$$\delta_2^1 = \frac{2\pi}{qN_s}\left(\frac{i-1}{m_g} + n_i + \alpha\right) \text{ [rad]} \quad (6)$$

In Equation (6), the respective reference symbols denote the following content.

$m_g$ denotes the number of slit end portions in the first group, and in FIG. 11, $m_g$=2.

The interval from the first slit end to the $i^{th}$ slit end of the slit walls on the same circumferential direction side is set as $\delta_i^1$, and here, i=2.

$n_i$ denotes a natural number no smaller than 1.

$\alpha$ denotes a number within a range of −¼ to ¼.

q denotes a natural number no smaller than 1.

$\varepsilon_2^1$ in the first group as well as $\delta_2^2$ and $\varepsilon_2^2$ in the second group are configured similarly. Hence, to summarize this content, the angles $\delta_2^1$, $\delta_2^2$, $\varepsilon_2^1$, and $\varepsilon_2^2$ in FIG. 11 are as shown on Table 2.

TABLE 2

Angles in FIG. 10

|  | q | $N_s$ | $m_g$ | $n_i$ or $l_i$ | α or β | $\delta^g_i$ or $\epsilon^g_i$ |
|---|---|---|---|---|---|---|
| $\delta^1_2$ | 1 | 36 | 2 | 1 | 0 | 15.0° |
| $\delta^2_2$ | 1 | 36 | 2 | 2 | 0 | 25.0° |
| $\epsilon^1_2$ | 1 | 36 | 2 | 1 | 0 | 15.0° |
| $\epsilon^2_2$ | 1 | 36 | 2 | 2 | 0 | 25.0° |

With this configuration, the phases of the qNs/p order components of the torque ripples generated by the slit walls 111g and 111h are respectively shifted by $2\pi/(qNs)\times\frac{1}{2}$. Accordingly, the sum thereof approaches zero, and as a result, the qNs/p order component of the torque ripple can be reduced.

Similarly, the qNs/p order components of the torque ripples generated by the slit wall 111i and the slit wall 111j, the qNs/p order components of the torque ripples generated by the slit wall 112g and the slit wall 112h, and the qNs/p order components of the torque ripples generated by the slit wall 112i and the slit wall 112j can respectively be reduced.

As shown in FIG. 8, α and β are preferably set within the range of $-\frac{1}{4}$ to $\frac{1}{4}$ so that the torque ripple can be reduced within a range that is unproblematic in practical terms. Furthermore, as described above, α and β are preferably set close to zero in order to increase the torque ripple reduction effect.

Furthermore, the number of slits 11 included in the flux barrier 12 is preferably no more than two. The reason for this is that when the number of slits is set at three or more, a proportion of magnetically deteriorated parts formed in the steel plate when the slits 11 are punched out increases, with the result that either the desired torque cannot be output, or the size of the reluctance motor 1 must be increased in order to output the desired torque.

Hence, by setting the number of slits 11 at no more than two, the desired torque can be output easily, and the torque ripple can be reduced while achieving a reduction in the size of the reluctance motor 1.

Figure 12:
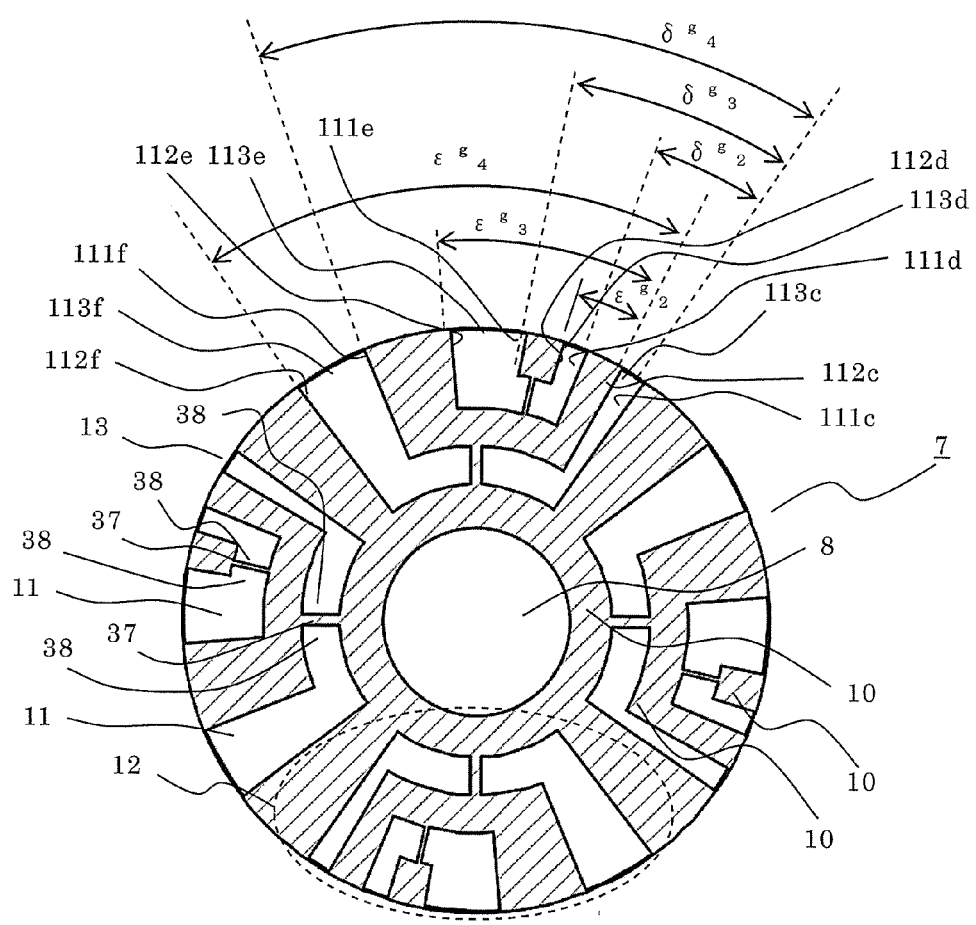
FIG. 12 is a sectional view showing ribs formed to connect core layers adjacent to slits in the reluctance motor according to the first embodiment of this invention.

Note that depending on the reluctance motor 1, ribs 37 connecting the core layers adjacent to the slits 11 may be formed in order to achieve an improvement in mechanical strength. FIG. 12 is a sectional view showing the ribs 37 formed to connect the core layers adjacent to the slits 11 in the reluctance motor 1 according to the first embodiment of this invention.

In this case, rib side end portions 38 are formed inside the slit 11, but the rib side end portions 38 are not counted as the slit end portions 113 of this invention. Similar effects can be obtained regardless of whether or not the ribs 37 are provided.

Further, q=1 is preferably established. The reason for this is that by reducing a torque ripple of the smallest order possible, a speed ripple occurring during fixed rotation driving, for example, can also be reduced.

Figure 13:
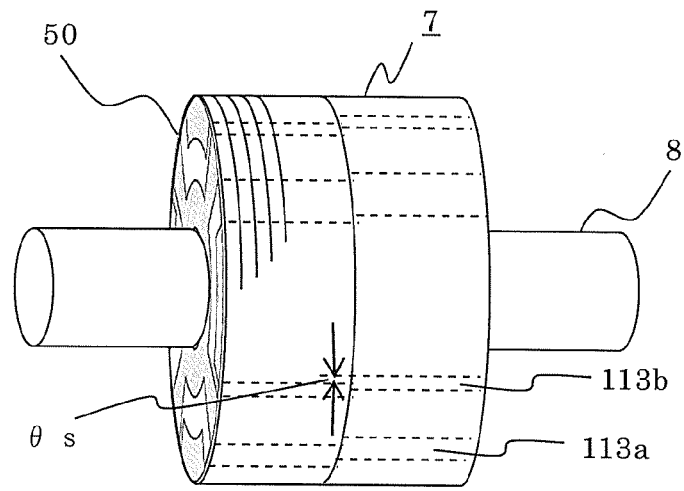
FIG. 13 is a view showing an example in which stepped skew is applied to the reluctance motor according to the first embodiment of this invention.
Figure 14:
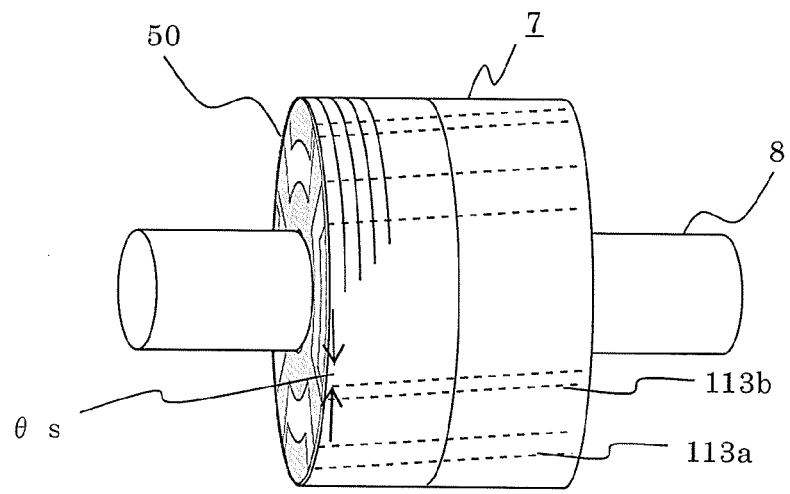
FIG. 14 is a view showing an example in which oblique skew is applied to the reluctance motor according to the first embodiment of this invention.

Moreover, a torque ripple of an order other than the order expressed by q is preferably reduced by applying stepped skew or oblique skew. FIG. 13 is a view showing an example in which stepped skew is applied to the reluctance motor 1 according to the first embodiment of this invention. Moreover, FIG. 14 is a view showing an example in which oblique skew is applied to the reluctance motor 1 according to the first embodiment of this invention.

Here, by establishing q=1, the order of the torque ripple to be reduced by a skewing technique can be increased, and a skew angle θs of the stepped skew or oblique skew can be reduced. As a result, a further effect of preventing a reduction in the output torque can be obtained.

Second Embodiment

Figure 15:
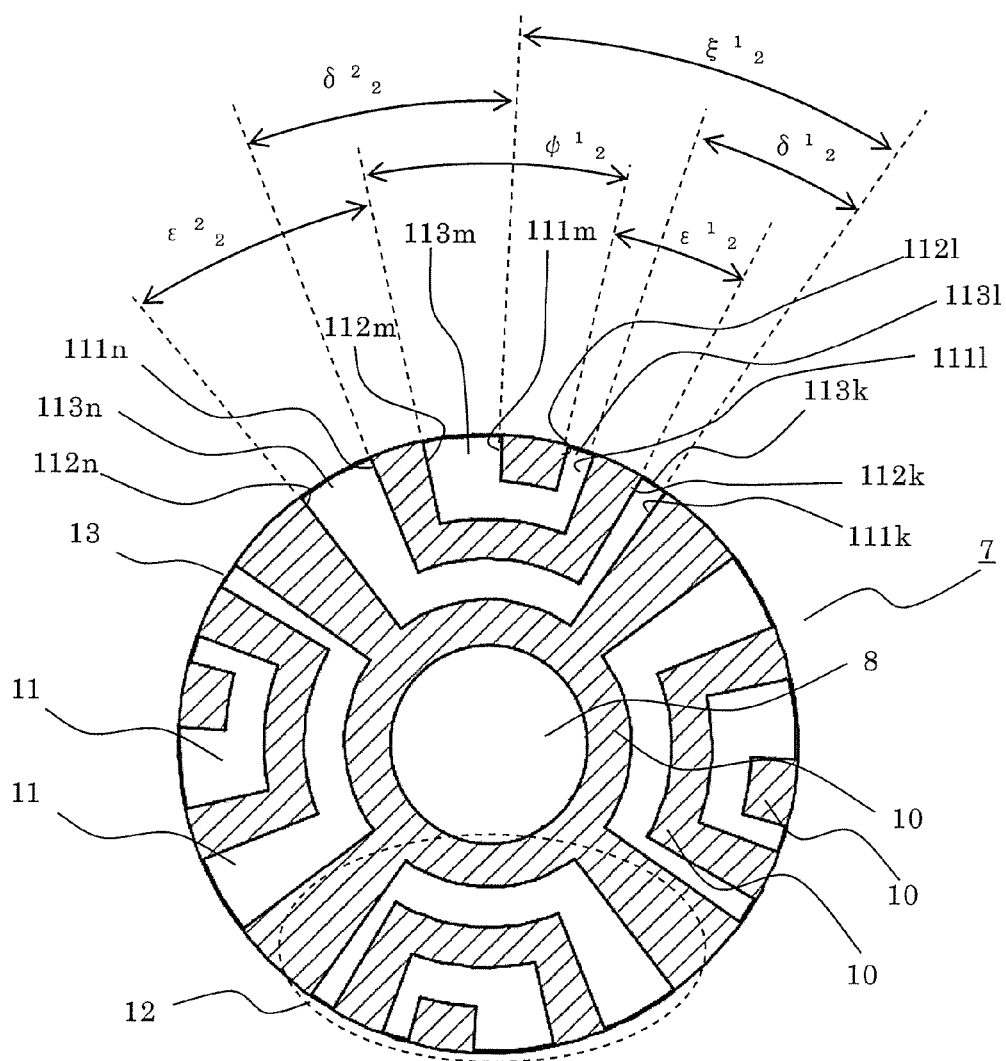
FIG. 15 is a sectional view showing a rotor core of a reluctance motor according to a second embodiment of this invention.

FIG. 15 is a sectional view showing the rotor core 7 of the reluctance motor 1 according to a second embodiment of this invention. This configuration is similar to that of FIG. 11, but differs therefrom in that a relative angle $\xi^1_2$ between a right side slit wall 111k of a first group first slit end portion 113k and a right side slit wall 111m of a second group first slit end portion 113m and a relative angle $\Psi^1_2$ between a left side slit wall 112l of a first group second slit end portion 113l and a left side slit wall 112m of the second group first slit end portion 113m are set respectively as shown below in Equations (7) and (8).

$$\xi^1_2 = \frac{2\pi}{rN_s}\left(\frac{j-1}{g} + k_j + \gamma\right) \text{ [rad]} \tag{7}$$

$$\psi^1_2 = \frac{2\pi}{rN_s}\left(\frac{j-1}{g} + s_j + \eta\right) \text{ [rad]} \tag{8}$$

In Equations (7) and (8), the respective reference symbols denote the following content.

g denotes the number of groups, and in FIG. 15, g=2.

An interval between the first group and a $j^{th}$ group is set at $\xi^1_j$ and $\phi^1_j$, and here, j=2.

$k_j$ and $s_j$ denote natural numbers no smaller than 1.

γ and η denote numbers within a range of $-\frac{1}{4}$ to $\frac{1}{4}$.

r denotes a natural number no smaller than 1, where r≠q.

By making r and q different in this manner, an rNs/p order component of the torque ripple, which is different to the qNs/p order component of the torque ripple determined by q, can be reduced simultaneously.

In the second embodiment, γ and η correspond to α and β of the first embodiment, and preferably, γ and η are set within the range of $-\frac{1}{4}$ to $\frac{1}{4}$ so that the torque ripple can be reduced within a range that is unproblematic in practical terms. Furthermore, as described above, γ and η are preferably set close to zero in order to increase the torque ripple reduction effect. To summarize this content, the angles $\delta^1_2$, $\delta^2_2$, $\epsilon^1_2$, $\epsilon^2_2$, $\xi^1_2$, and $\phi^1_2$ in FIG. 15 are as shown on Table 3.

TABLE 3

Angles in FIG. 11

|  | q or r | $N_s$ | $m_g$ or g | $n_i$ or $l_i$ or $k_j$ or $s_j$ | α or β or γ or η | $\delta^g_i$ or $\epsilon^g_i$ or $\xi^g_j$ or $\psi^g_j$ |
|---|---|---|---|---|---|---|
| $\delta^1_2$ | 1 | 36 | 2 | 1 | 0 | 15.0° |
| $\delta^2_2$ | 1 | 36 | 2 | 2 | 0 | 25.0° |
| $\epsilon^1_2$ | 1 | 36 | 2 | 1 | 0 | 15.0° |
| $\epsilon^2_2$ | 1 | 36 | 2 | 2 | 0 | 25.0° |
| $\xi^1_2$ | 2 | 36 | 2 | 6 | 0 | 32.5° |
| $\psi^1_2$ | 2 | 36 | 2 | 8 | 0 | 42.5° |

Third Embodiment

Figure 16:
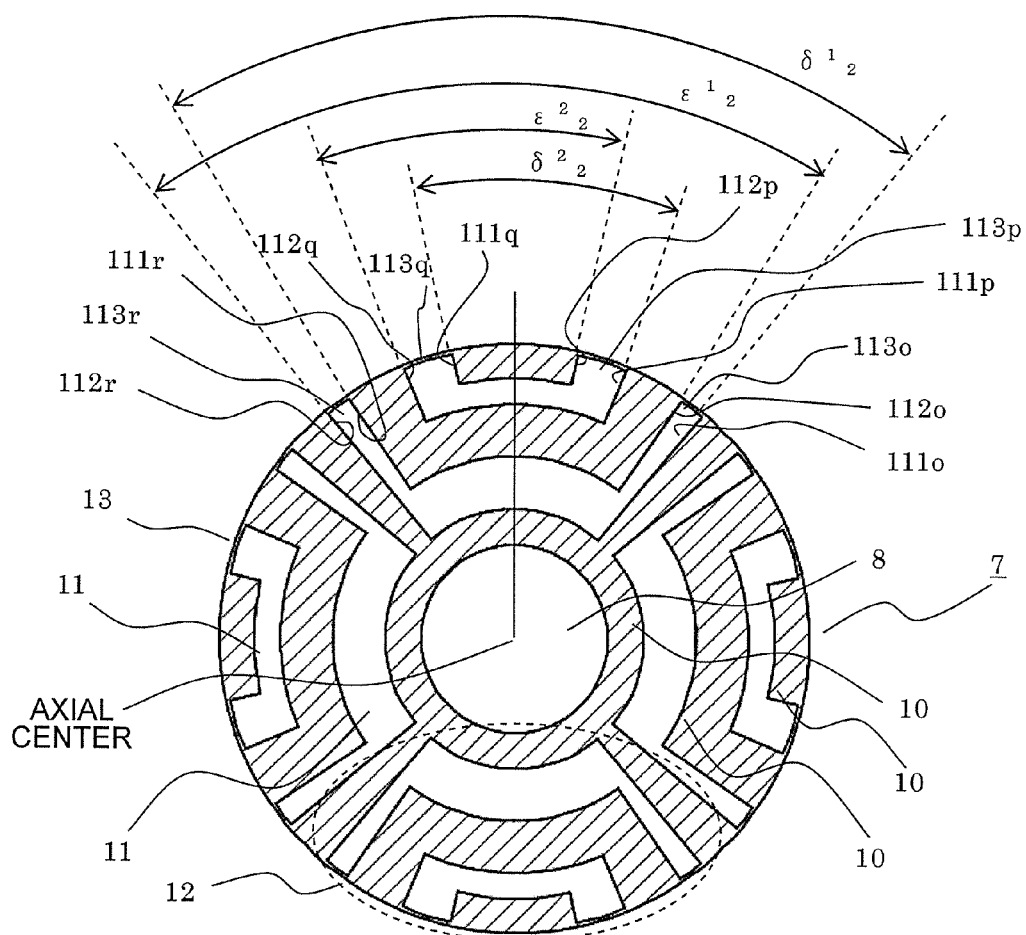
FIG. 16 is a sectional view showing a rotor core of a reluctance motor according to a third embodiment of this invention.

FIG. 16 is a sectional view showing the rotor core 7 of the reluctance motor 1 according to a third embodiment of this invention. This configuration is similar to that shown in FIG.

11, except that the first group is constituted by slit end portions 113*o* and 113*r* and the second group is constituted by slit end portions 113*p* and 113*q*. FIG. 16 also differs from FIG. 11 in that $n_i=l_i$ is established in the respective groups such that the slits 11 are formed in line symmetry to the circumferential direction center of the slits 11.

Likewise with this configuration, the qNs/p order component of the torque ripple can be reduced, and in addition, characteristics obtained when torque is output respectively in a leftward direction and a rightward direction can be made identical. To summarize this content, the angles $\delta^1_2$, $\delta^2_2$, $\epsilon^1_2$, and $\epsilon^2_2$ in FIG. 16 are as shown on Table 4.

TABLE 4

Angles in FIG. 12

|  | q | $N_s$ | $m_g$ | $n_i$ or $l_i$ | α or β | $\delta^g_i$ or $\epsilon^g_i$ |
|---|---|---|---|---|---|---|
| $\delta^1_2$ | 1 | 36 | 2 | 7 | 0 | 75.0° |
| $\delta^2_2$ | 1 | 36 | 2 | 3 | 0 | 35.0° |
| $\epsilon^1_2$ | 1 | 36 | 2 | 7 | 0 | 75.0° |
| $\epsilon^2_2$ | 1 | 36 | 2 | 3 | 0 | 35.0° |

Fourth Embodiment

Figure 17A:
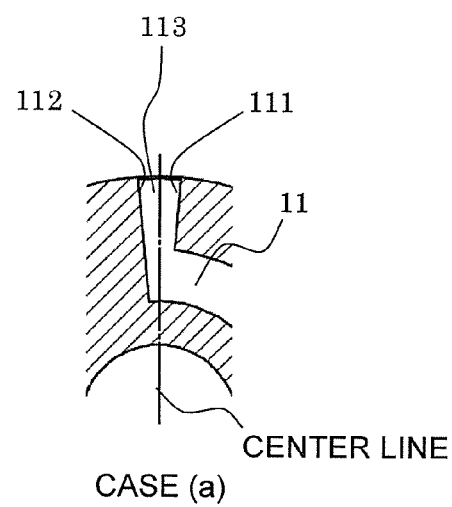
FIG. 17A is an enlarged sectional view showing slit end portions of a reluctance motor according to a fourth embodiment of this invention in a case (a).
Figure 17B:
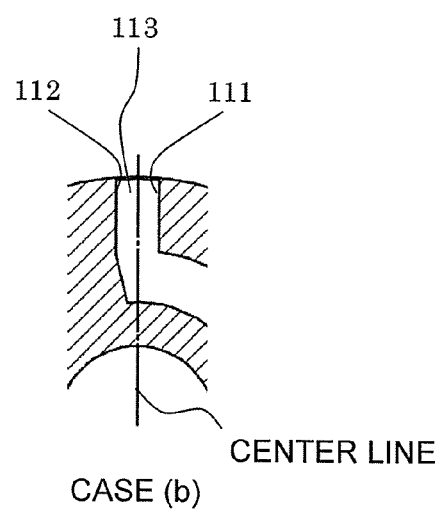
FIG. 17B is an enlarged sectional view showing slit end portions of the reluctance motor according to the fourth embodiment of this invention in a case (b).
Figure 17C:
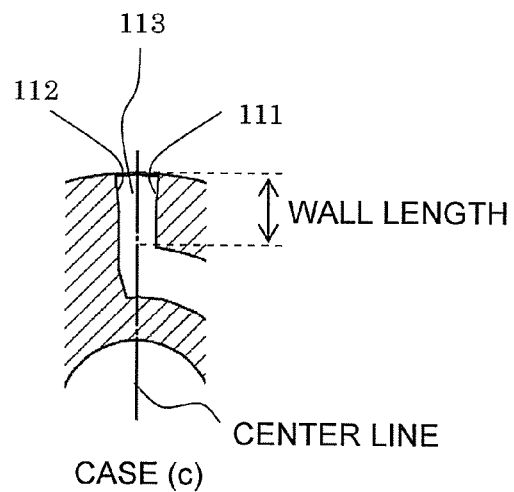
FIG. 17C is an enlarged sectional view showing slit end portions of the reluctance motor according to the fourth embodiment of this invention in a case (c).

FIGS. 17A to 17C are enlarged sectional views showing slit end portions of the reluctance motor 1 according to a fourth embodiment of this invention. More specifically, FIGS. 17A, 17B, and 17C respectively show a case (a), a case (b), and a case (c) as examples of variations of the slit end portions 113. In all variations, a center line is drawn through the axial center and the circumferential direction center of the slit end portion 113. In FIGS. 17A to 17C, the slit wall 111 and the slit wall 112 are in line symmetry to the center line.

With this configuration, the waveforms of the torque ripples generated by the slit walls 111, 112 can be made basically identical, and as a result, the torque ripple reduction effect described in the first to third embodiments can be obtained more easily.

Fifth Embodiment

In a fifth embodiment, a relationship between a wall length of the slit end portion 113 and the torque ripple will be investigated. The wall length is defined in case (c) of the fourth embodiment, shown in FIG. 17C. The slit end portion 113 has two parts that extend from the rotor outer periphery toward the inner periphery, and the wall length corresponds to the length on the shorter side thereof. This part is the part from which the torque ripple is generated.

The rotor core 7 is manufactured by punching the slits out of a thin steel plate. Therefore, the wall length varies due to manufacturing errors. By increasing the length of this part, the effect of manufacturing errors can be reduced, and therefore a stable torque ripple waveform can be generated. As a result, the torque ripple reduction effect described in the first to third embodiments can be obtained more easily.

Figure 18:
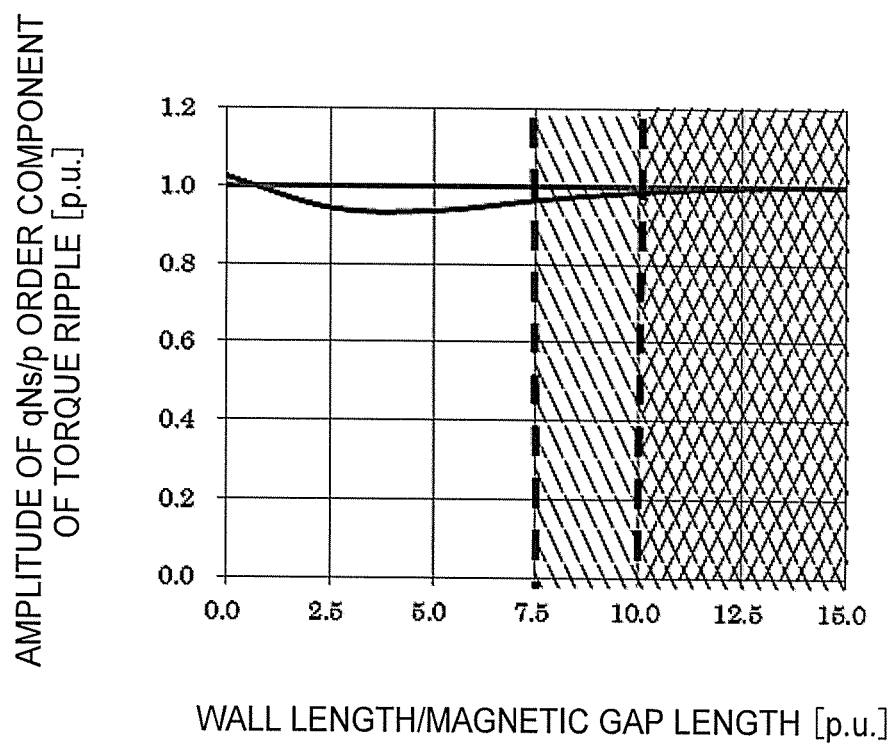
FIG. 18 is a view showing a relationship between a wall length and the qNs/p order component of the torque ripple in a reluctance motor according to a fifth embodiment of this invention.

FIG. 18 is a view showing a relationship between the wall length and the qNs/p order component of the torque ripple in the reluctance motor 1 according to the fifth embodiment of this invention. FIG. 18 shows a condition in which the amplitude of the qNs/p order component of the torque ripple is dependent on the wall length. Magnetic resistance pulsation caused by the slit end portions appears as a steadily more striking effect as the length of the magnetic gap increases. Hence, the wall length is normalized by being divided by the length of the magnetic gap, and in FIG. 18, a part where the amplitude of the torque ripple reaches 1.0 p. u. is indicated by a thick line.

In FIG. 18, the amplitude of the torque ripple is stabilized within a range of 0.95 to 1.00 p. u. in a region where wall length/magnetic gap length is no smaller than 7.5. Therefore, by setting wall length/magnetic gap length to be no smaller than 7.5, the effect of manufacturing errors on the torque ripple reduction effect can be reduced. In other words, to reduce the torque ripple, the slit end portions 113 are preferably shaped such that wall length/magnetic gap length is no smaller than 7.5.

More preferably, by configuring the slit end portions 113 such that wall length/magnetic gap length is no smaller than 10, the amplitude of the torque ripple can be stabilized within a range of 0.98 to 1.00 p. u., and as a result, manufacturing errors are even less likely to have an effect.

Sixth Embodiment

Figure 19:
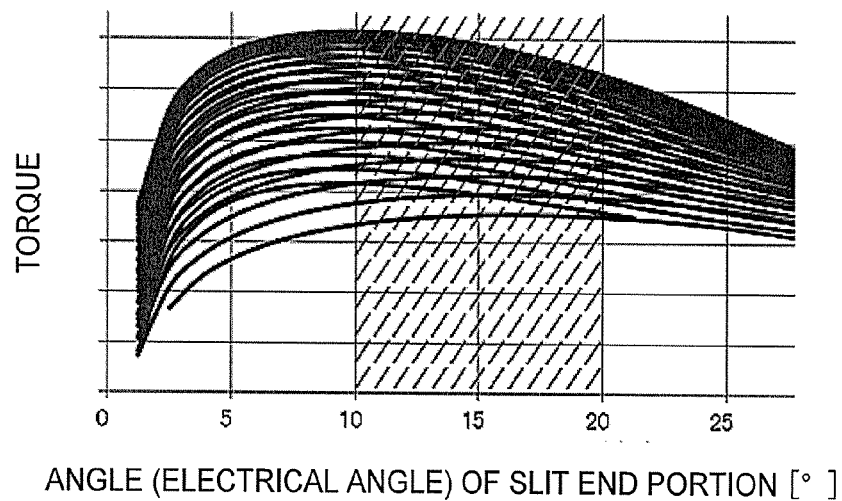
FIG. 19 is a view showing a relationship between an angle of the slit end portion and an output torque in a reluctance motor according to a sixth embodiment of this invention.

FIG. 19 is a view showing a relationship between the angle of the slit end portion and the output torque in the reluctance motor 1 according to a sixth embodiment of this invention. More specifically, FIG. 19 is a view illustrating a relationship between the angle of the slit end portion and the torque obtained when an identical current is supplied. In FIG. 19, a torque peak appears when an electrical angle of the slit end portion 113 is between 10° and 20°, whereby the output can be increased. Hence, while employing the configurations of the first to fifth embodiments, the angle θ of the slit end portion 113 is preferably set at an electrical angle between 10° and 20°.

Figure 20:
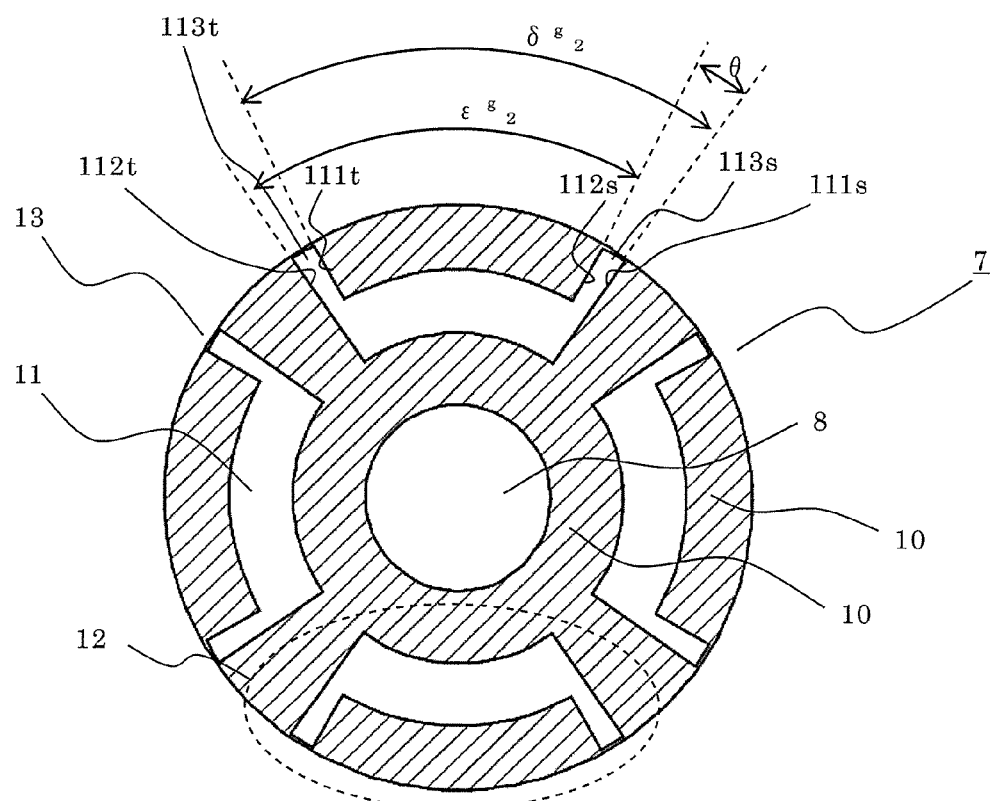
FIG. 20 is a sectional view showing a rotor core of the reluctance motor according to the sixth embodiment of this invention.

With this configuration, the torque ripple can be reduced while increasing the output torque. A specific example of this configuration will now be described using the drawings. FIG. 20 is a sectional view showing the rotor core 7 of the reluctance motor 1 according to the sixth embodiment of this invention. Angles $\delta^g_2$ and $\epsilon^g_2$ in FIG. 20 are as shown on Table 5.

TABLE 5

Angles in FIG. 19

|  | q | $N_s$ | $m_g$ | $n_i$ or $l_i$ | α or β | $\delta^g_i$ or $\epsilon^g_i$ |
|---|---|---|---|---|---|---|
| $\delta^g_2$ | 1 | 36 | 2 | 6 | 0 | 65.0° |
| $\epsilon^g_2$ | 1 | 36 | 2 | 6 | 0 | 65.0° |
| θ | — | — | — | — | — | 5° |

As shown on Table 5, θ in FIG. 20 is set at θ=5°, and since four poles exist in the sixth embodiment, θ takes an electrical angle of 10°.

Hence, by setting the angle θ of the slit end portion 113 at an electrical angle of 10° while employing the configuration of the first embodiment, a double effect of reducing the torque ripple while increasing the output torque can be achieved.

Seventh Embodiment

Figure 21:
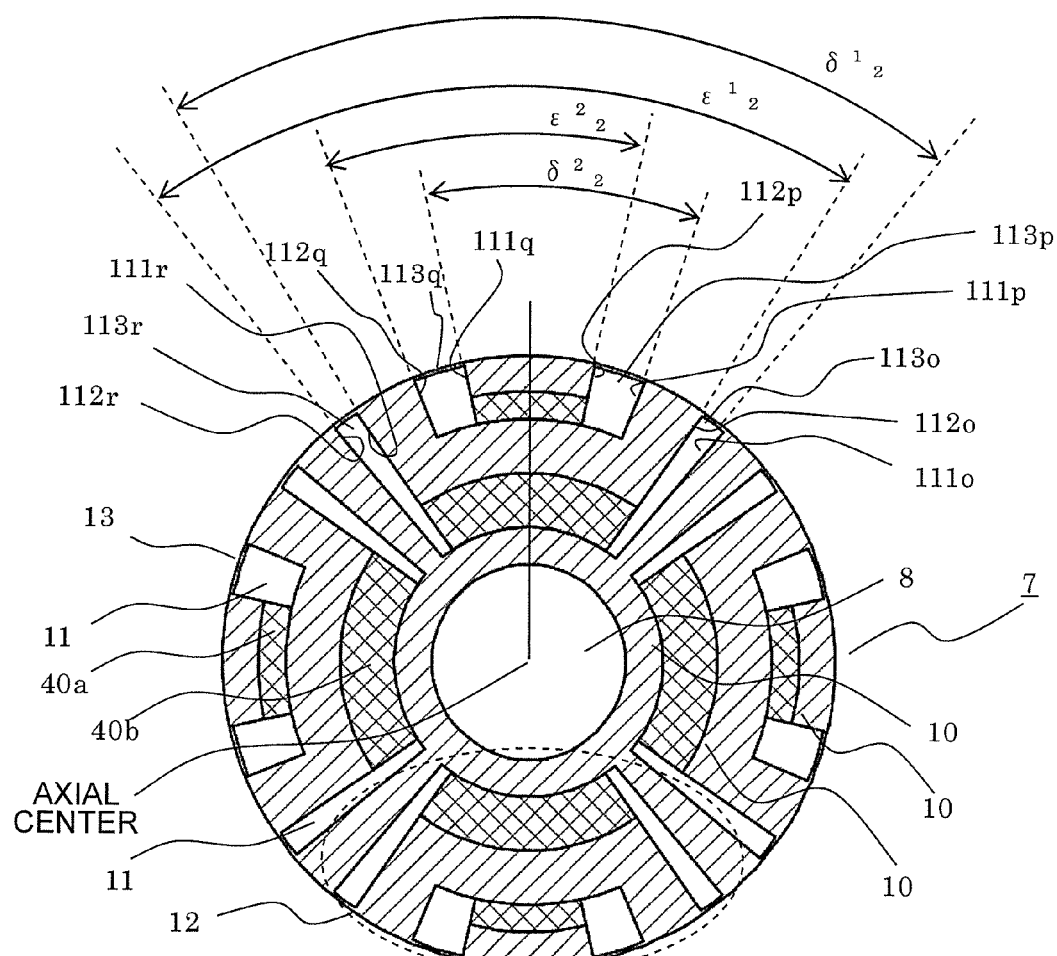
FIG. 21 is a sectional view showing a rotor of a reluctance motor according to a seventh embodiment of this invention.

FIG. 21 is a sectional view showing the rotor of the reluctance motor 1 according to a seventh embodiment of this invention. The rotor core 7 is shaped identically to that of FIG. 16, but differs therefrom in that permanent magnets 40a, 40b are disposed inside a part of the slits 11. The permanent magnets 40a, 40b are magnetized such that adjacent magnetic poles in the circumferential direction are different to each other, and the permanent magnets 40a, 40b disposed in the same flux barrier 12 are magnetized so as to form identical magnetic poles.

By disposing the permanent magnets 40a, 40b in this manner, magnetic flux based on the permanent magnets 40a, 40b can be obtained. Hence, magnet torque is generated in addition to reluctance torque, enabling an increase in the torque generated by the motor, while at the same time, the torque ripple can be reduced.

Note, however, that when the magnetic flux based on the permanent magnets 40a, 40b is excessively large, the magnetic characteristic of the rotor core 7 changes, thereby affecting the torque ripple waveform. Hence, the magnet torque generated by the magnetic flux based on the permanent magnets 40a, 40b is preferably smaller than the reluctance torque. To achieve this, the permanent magnets 40a, 40b are preferably formed from a material having a residual magnetic flux density of 1.0 T or less, such as neodymium bonded magnets or ferrite magnets, for example.

Furthermore, to ensure that the permanent magnets 40a, 40b, which have a rectangular cross-section, can be disposed, the slits 11 are preferably configured such that an outer peripheral side and an inner peripheral side of the slit form parallel straight lines. The cross-section of the permanent magnets 40a, 40b is rectangular to simplify processing thereof. As is well known, a permanent magnet is cut out of a base material formed in a die, and then polished. When the permanent magnets can be formed to have a rectangular cross-section, this processing is simplified.

Figure 22:
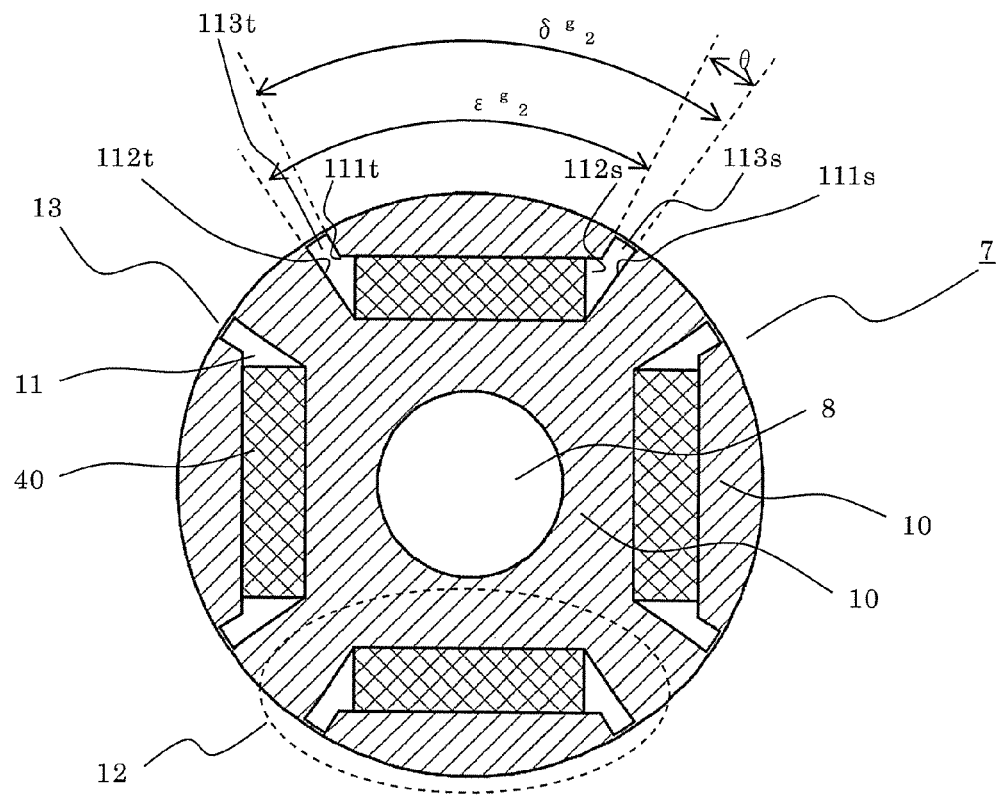
FIG. 22 is a sectional view showing another example of the rotor of the reluctance motor according to the seventh embodiment of this invention.

FIG. 22 is a sectional view showing another example of the rotor of the reluctance motor 1 according to the seventh embodiment of this invention. In FIG. 22, slit end portions 113s, 113t are configured as in the first to sixth embodiments, and permanent magnets 40 having a rectangular cross-section are disposed therein. With this configuration, in addition to the increase in the generated torque corresponding to the magnet torque and the reduction in the torque ripple, the processing implemented on the permanent magnets can be simplified.

Figure 23:
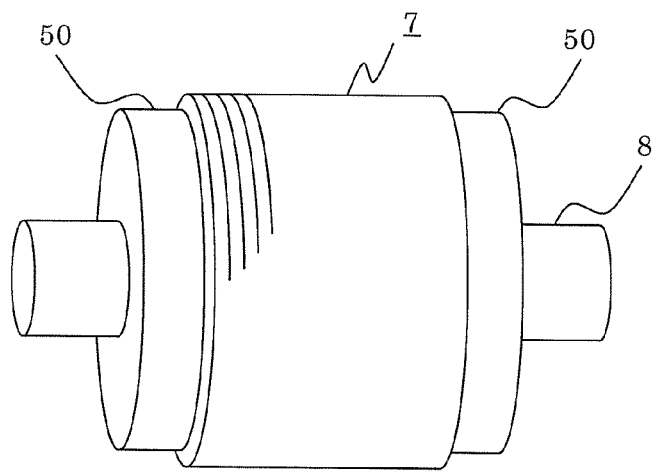
FIG. 23 is a perspective view showing the rotor of the reluctance motor according to the seventh embodiment of this invention.

FIG. 23 is a perspective view showing the rotor of the reluctance motor 1 according to the seventh embodiment of this invention. End plates 50 are disposed on respective axial direction end faces of the rotor core 7 to prevent the permanent magnets 40 from jumping out. Note that for simplicity, the end plates 50 are disc-shaped in FIG. 23, but as long as the end plates 50 can function to prevent the permanent magnets 40 from jumping out and ensure that rotation balance is maintained, the shape thereof is not limited to a disc shape.

By employing this structure, a function for preventing the permanent magnets 40 from jumping out can be obtained, and moreover, by opening holes in the end plates 50 using a drill or the like following assembly of the rotor so that balance is achieved, a balancer function can be obtained.

Figure 24:
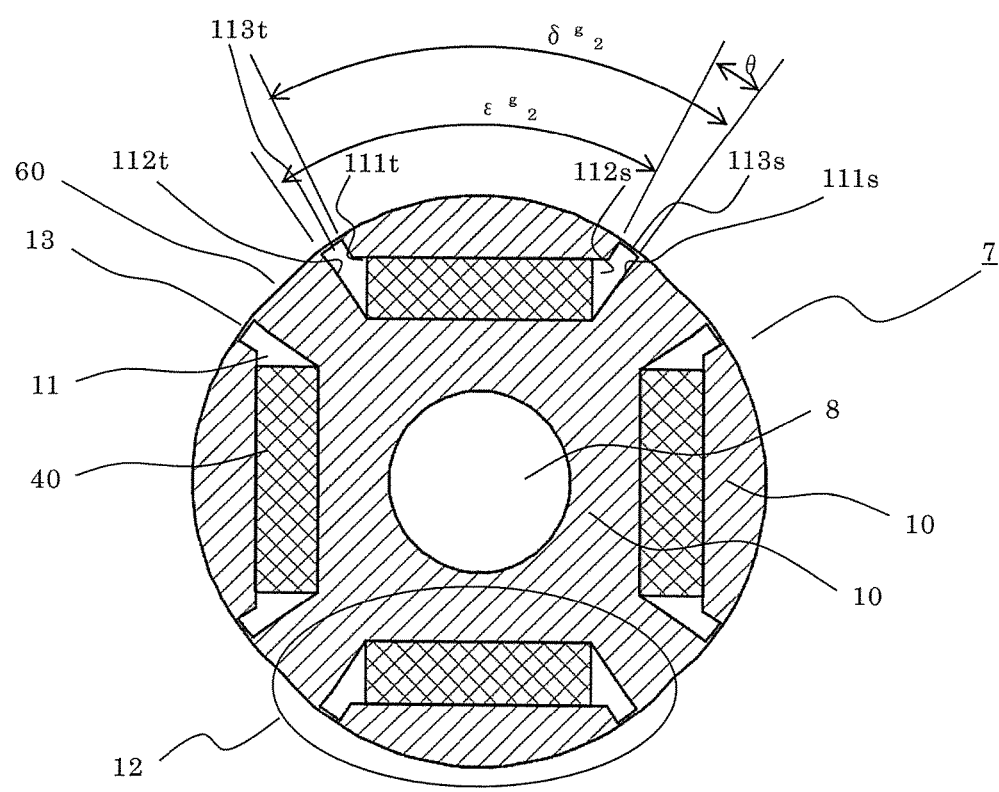
FIG. 24 is a sectional view showing a further example of the rotor of the reluctance motor according to the seventh embodiment of this invention.

FIG. 24 is a sectional view showing a further example of the rotor of the reluctance motor 1 according to the seventh embodiment of this invention. As shown in FIG. 24, indentations 60 are preferably provided in the outer peripheral surface of the rotor core 7 in the circumferential direction center of the respective phases of the permanent magnets 40. By providing the indentations 60, cogging torque generated when the permanent magnets 40 are disposed can be reduced.

The invention claimed is:

1. A reluctance motor comprising:
a rotor configured by fixing a rotor core to a shaft; and
a stator having slots in which windings are housed,
the rotor and the stator being disposed to be free to rotate via a magnetic gap,
wherein the number of the slots is set as Ns,
the rotor core includes flux barriers formed in a circumferential direction in an identical number to the number of poles by arranging one or more slits and core layers alternately in a radial direction,
slit end portions close to a rotor outer periphery, of the slits provided for each pole, are divided into at least one group,
the number of slit end portions included in one group having a group number g is set as $m_g$, and numbers from first to $m_g^{th}$ are allocated to the slit end portions sequentially from a right side of the circumferential direction, and
the flux barriers are respectively configured such that, with respect to slit walls extending from the rotor outer periphery toward an inner periphery in each slit end portion, when an interval from a first slit end to an $i^{th}$ slit end of a right side slit wall, as seen in the circumferential direction, is set as $\delta^g_i$, $n_1$ is set as a natural number no smaller than 1, $\alpha$ is set as a number within a range no smaller than $-\frac{1}{4}$ and no larger than $\frac{1}{4}$, and q is set as a natural number no smaller than 1, $\delta^g_i$ satisfies Equation (1) shown below $$\delta^g_i = \frac{2\pi}{qN_s}\left(\frac{i-1}{m_g} + n_i + \alpha\right) \text{ [rad]} \tag{1}$$

and when an interval from a first slit end to an $i^{th}$ slit end of a left side slit wall, as seen in the circumferential direction, is set as $\varepsilon^g_i$, $l_1$ is set as a natural number no smaller than 1, $\beta$ is set as a number within a range no smaller than $-\frac{1}{4}$ and no larger than $\frac{1}{4}$, and q is set as a natural number no smaller than 1, $\varepsilon^g_i$ satisfies Equation (2) shown below $$\varepsilon^g_i = \frac{2\pi}{qN_s}\left(\frac{i-1}{m_g} + l_i + \beta\right) \text{ [rad]}. \tag{2}$$

2. The reluctance motor according to claim 1, wherein the group is a plurality of groups, and
the flux barriers are respectively configured such that, when a circumferential direction interval from the right side slit wall extending from the rotor outer periphery toward the inner periphery in a first group first slit end portion to the right side slit wall extending from the rotor outer periphery toward the inner periphery in a $j^{th}$ group first slit end portion is set as $\xi^g_j$, $k_j$ is set as a natural number no smaller than 1, $\gamma$ is set as a number within a range no smaller than $-\frac{1}{4}$ and no larger than $\frac{1}{4}$, and r is set as a natural number no smaller than 1, $\xi^g_j$ satisfies Equation (3) shown below $$\xi^g_j = \frac{2\pi}{rN_s}\left(\frac{j-1}{g} + k_j + \gamma\right) \text{ [rad]} \tag{3}$$

and when a circumferential direction interval from the left side slit wall extending from the rotor outer periphery toward the inner periphery in the first group first slit end portion to the left side slit wall extending from the rotor outer periphery toward the inner periphery in the $j^{th}$ group first slit end portion is set as $\Psi^g_j$, $s_j$ is set as a natural number no smaller than 1, $\eta$ is set as a number within a range no smaller than $-\frac{1}{4}$ and no larger than $\frac{1}{4}$, and r is set as a natural number no smaller than 1, 105 $^g_j$ satisfies Equation (4) shown below $$\psi^g_j = \frac{2\pi}{rN_s}\left(\frac{j-1}{g} + s_j + \eta\right) \text{ [rad]}. \tag{4}$$

3. The reluctance motor according to claim 1, wherein the slits are each shaped to be line symmetrical to a line passing through a slit center and an axial center.

4. The reluctance motor according to claim 1, wherein the end portions of the slits are each shaped such that the right side slit wall and the left side slit wall are line symmetrical to a line passing through a circumferential direction center of the slit end portion and an axial center.

5. The reluctance motor according to claim 1, wherein the end portions of the slits are each shaped such that, when a length of a shorter slit wall, among the right side slit wall and the left side slit wall, of one slit end portion is set as a wall length, a value of a fraction having the wall length as a numerator and a radial direction length of the magnetic gap as a denominator is no smaller than 7.5.

6. The reluctance motor according to claim 1, wherein the end portions of the slits are each shaped such that an electrical angle of the slit end portion is within a range no smaller than 10° and no larger than 20°.

7. The reluctance motor according to claim 1, wherein a permanent magnet is disposed in a part of the interior of each of the slits.

8. A manufacturing method for a rotor core used in a reluctance motor, the reluctance motor having a rotor configured by fixing a rotor core to a shaft, and a stator having slots in which windings are housed, the rotor and the stator being disposed to be free to rotate via a magnetic gap,
wherein, in a case where the number of the slots is set as Ns,
the rotor core includes flux barriers formed in a circumferential direction in an identical number to the number of poles by arranging one or more slits and core layers alternately in a radial direction,
slit end portions close to a rotor outer periphery, of the slits provided for each pole, are divided into at least one group,
the number of slit end portions included in one group having a group number g is set as $m_g$, and
numbers from first to $m_g^{th}$ are allocated to the slit end portions sequentially from a right side of the circumferential direction,
the manufacturing method comprises a step of forming the slits by implementing punching processing on a thin steel plate such that, with respect to slit walls extending from the rotor outer periphery toward an inner periphery in each slit end portion, when an interval from a first slit end to an $i^{th}$ slit end of a right side slit wall, as seen in the circumferential direction, is set as $\delta^g_i$, $n_1$ is set as a natural number no smaller than 1, $\alpha$ is set as a number within a range no smaller than $-\frac{1}{4}$ and no larger than $\frac{1}{4}$, and q is set as a natural number no smaller than 1, $\delta^g_i$ satisfies Equation (5) shown below $$\delta^g_i = \frac{2\pi}{qN_s}\left(\frac{i-1}{m_g} + n_i + \alpha\right) \text{ [rad]} \tag{5}$$

and when an interval from a first slit end to an $i^{th}$ slit end of a left side slit wall, as seen in the circumferential direction, is set as $\varepsilon^g_i$, $l_1$ is set as a natural number no smaller than 1, $\beta$ is set as a number within a range no smaller than $-\frac{1}{4}$ and no larger than $\frac{1}{4}$, and q is set as a natural number no smaller than 1, $\varepsilon^g_i$ satisfies Equation (6) shown below $$\varepsilon^g_i = \frac{2\pi}{qN_s}\left(\frac{i-1}{m_g} + l_i + \beta\right) \text{ [rad]}. \tag{6}$$

9. The manufacturing method for a rotor core used in a reluctance motor according to claim 8, wherein the end portions of the slits are each shaped such that, when a length of a shorter slit wall, among the right side slit wall and the left side slit wall, of one slit end portion is set as a wall length, a value of a fraction having the wall length as a numerator and a radial direction length of the magnetic gap as a denominator is no smaller than 7.5.

* * * * *